US005744898A

United States Patent [19]
Smith et al.

[11] Patent Number: 5,744,898
[45] Date of Patent: Apr. 28, 1998

[54] ULTRASOUND TRANSDUCER ARRAY WITH TRANSMITTER/RECEIVER INTEGRATED CIRCUITRY

[75] Inventors: Stephen W. Smith, Durham; Gregg E. Trahey, Hillsborough; Richard L. Goldberg; Richard E. Davidsen, both of Durham, all of N.C.

[73] Assignee: Duke University, Durham, N.C.

[21] Appl. No.: 752,433

[22] Filed: Nov. 19, 1996

Related U.S. Application Data

[63] Continuation of Ser. No. 227,047, Apr. 13, 1994, abandoned, and a continuation-in-part of Ser. No. 962,455, Oct. 16, 1992, Pat. No. 5,329,496, and Ser. No. 883,006, May 14, 1992, Pat. No. 5,311,095.

[51] Int. Cl.$^6$ ........................................... H01L 41/08
[52] U.S. Cl. .................. 310/334; 128/662.03; 310/336
[58] Field of Search ...................... 310/316, 317, 310/319, 334, 336, 337; 128/661.01, 662.03, 663.01; 73/642

[56] References Cited

U.S. PATENT DOCUMENTS

| | | | |
|---|---|---|---|
| 3,881,466 | 5/1975 | Wilcox | 358/112 |
| 4,211,948 | 7/1980 | Smith et al. | 310/322 |
| 4,217,684 | 8/1980 | Brisken et al. | 310/334 |
| 4,285,010 | 8/1981 | Wilcox | 358/112 |
| 4,296,349 | 10/1981 | Nakanishi et al. | 310/335 |
| 4,489,729 | 12/1984 | Sorenson et al. | 128/660 |
| 4,543,960 | 10/1985 | Harui et al. | 128/660 |
| 4,572,981 | 2/1986 | Zola | 310/357 |
| 4,603,276 | 7/1986 | Coursant | 310/368 |
| 4,638,468 | 1/1987 | Francis | 367/153 |
| 4,737,742 | 4/1988 | Takoshima et al. | 310/313 R |
| 4,747,192 | 5/1988 | Rokurota | 310/327 |
| 4,755,708 | 7/1988 | Granz et al. | 310/334 |
| 4,773,140 | 9/1988 | McAusland | 310/334 |
| 4,865,042 | 9/1989 | Umemura et al. | 128/660.03 |
| 4,890,268 | 12/1989 | Smith | 367/138 |
| 4,894,013 | 1/1990 | Smith et al. | 434/268 |
| 4,917,097 | 4/1990 | Eberle | 128/662.06 |
| 4,945,915 | 8/1990 | Nagasaki | 128/660.07 |
| 4,958,327 | 9/1990 | Saitoh et al. | 367/137 |
| 4,959,998 | 10/1990 | Yano | 73/626 |

(List continued on next page.)

FOREIGN PATENT DOCUMENTS

| | | |
|---|---|---|
| 0 355 694 | 2/1990 | European Pat. Off. |
| WO89/04143 | 5/1989 | WIPO . |

OTHER PUBLICATIONS

K.R. Erikson, et al.; *Integrated Acoustic Array*, Abstract 1976, pp. 423–445.

J.F. Gelly, et al.; *Properties for A 2D Multiplexed Array For Acoustic Imaging*, 1981 Ultrasonics Symposium, pp. 685–689.

D.H. Turnbull, et al.; *Beam Steering with Pulsed Two-Dimensional Transducer Arrays*, IEEE Transaction on Ultransonics, Ferroelectrics, and Frequency Control, 38 No. 4, Jul. 1991.

L.S. Buchorr; *Elastomeric Connectors For Land Grid Array Packages*, Connection Technology, Apr. 1989.

A.J. Blodgett, Jr.; *Microelectronic Packaging*, Scientific American, 249(1): 86–96 Jan. 1983.

(List continued on next page.)

Primary Examiner—Mark O. Budd
Attorney, Agent, or Firm—Myers Bigel Sibley & Sajovec, L.L.P.

[57] ABSTRACT

An ultrasonic transducer assembly is disclosed having both transmit and receive circuitry integral to the transducer assembly for generating and receiving ultrasonic pulses. The ultrasonic transducer array which is integral with the transducer assembly preferably includes multi-layer transducer elements as transmit elements of the array and may include single layer transducer elements as receive elements. Also disclosed is an ultrasonic scanner utilizing the transducer assembly with integral transmit and receive circuitry to reduce the amount and complexity of interconnections between the transducer assembly and a scanner rack.

44 Claims, 20 Drawing Sheets

U.S. PATENT DOCUMENTS

| | | | |
|---|---|---|---|
| 5,014,711 | 5/1991 | Nagasaki | 128/660.07 |
| 5,045,746 | 9/1991 | Wersing et al. | 310/334 |
| 5,083,568 | 1/1992 | Shimazaki et al. | 310/335 X |
| 5,091,893 | 2/1992 | Smith et al. | 367/153 |
| 5,097,709 | 3/1992 | Masuzawa et al. | 310/334 X |
| 5,123,415 | 6/1992 | Daigle | 128/661.01 |
| 5,135,486 | 8/1992 | Eberle | 128/662.06 |
| 5,163,436 | 11/1992 | Saitoh et al. | 310/335 X |
| 5,167,233 | 12/1992 | Eberle et al. | 128/662.06 |
| 5,183,048 | 2/1993 | Eberle | 128/662.06 |
| 5,271,403 | 12/1993 | Paulos | 128/660.07 |
| 5,295,487 | 3/1994 | Saitoh et al. | 128/662.03 |
| 5,311,095 | 5/1994 | Smith et al. | 310/334 |
| 5,329,496 | 7/1994 | Smith | 310/336 X |
| 5,329,498 | 7/1994 | Greenstein | 310/334 X |
| 5,349,262 | 9/1994 | Grenon et al. | 310/334 |
| 5,381,385 | 1/1995 | Greenstein | 310/334 X |
| 5,459,368 | 10/1995 | Onishi et al. | 310/313 R |

OTHER PUBLICATIONS

D.W. Fitting, et al.; *A Two–Dimensional Array Receiver for Reducing Refraction Artifacts in Ultrasonic Computed Tomography of Attenuation*, IEEE Transactions on Ultrasonics, Ferroelectrics, and Grequency Control, Vole UFFC–34, No. 3, May 1987.

Ph Defranould, et al.; *Design of a Two–Dimensional Array for B and C Ultrasonic Imaging System*, Ultrasonics Symposium Proceedings, IEEE Cat.

M. Pappalardo; *Hybrid Linear and Martrix Acoustic Arrays*, Ultrasonics, pp. 81–86, Mar. 1981.

J.D. Plummer, et al.; *Two–Dimensional Transmit/Receive Ceramic Piezoelectric Arrays: Construction and Performance*, IEEE Transactions on Sonics and Ultransonics, vol. SU–25, No. 5, Sep., 1978.

R.J. Bobber; *Underwater Electroacoustic Measurements, Measurement Transducers*, 237–285 (1970).

W.A. Smith; *New Opportunities in Ultrasonic Transducers Emerging from Innovations in Piezoelectric Materials*, Proceedings, 1733:3–26 (1992).

N. Bom, et al.; *An Ultrasonic Intracardiac Scanner*, Paper received from Thoraxcentre, University Hospital 'Dijkzigt' Rotterdam, the Netherlands, (1971).

S.W. Smith, et al.; *Performance of Multi–layer PZT Transducer Arrays*, IEEE Ultrasonics Symposium and Short Courses (1992).

R.L. Goldberg, et al.; *Multi–layer PZT Transducer Arrays for Improved Sensitivity*, IEEE Ultrasoncis Symposium and Short Courses (1992).

S.W. Smith, et al; *Two–Dimensional Array Transducers Using Hybrid Connection Technology*, IEEE Ultrasonics Symposium and Short Courses (1992).

S.W. Smith, et al.; *Two–Dimensional Array Transducers Using Thick Film Connection Technology*, IEEE Ultrasonics Symposium and Short Courses, Abstract (1993).

A.L. Robinson, et al.; *Applications of Microelectronics and Microfabrication to Ultrasound Imaging Systems*, IEEE Ultrasonics Symposium (1992).

R.L. Goldberg, et al.; In Vivo *Imaging Using a Copolymer Phased Array*, Ultrasonic Imaging 14: 234–248 (1992).

R.G. Swartz, et al.; *Integrated Silicon–$PVF_2$ Acoustic Transducer Arrays*, IEEE Transactions on Electron Devises, ED–26: 1921–1931 (1991).

J. Mo, et al.; *Micromachining for Improvement of Integrated Ultrasonic Transducer Sensitivity*, IEEE (1990).

S. Corbett, et al.; *Conceptual Monolithic Pad grid Array Connector for Transducer Interconnects*, SPIE 1733: 249–259 (1992).

C. Oakley, et al.; *Development of 1–3 Ceramic–Air Composite Transducers*, SPIE 1733: 274–283 (1992).

Pohanka, et al.; *Recent Advances in Piezoelectric Ceramics, Electronic Ceramics: Properties, Devices, and Applications*, pp. 103–113 (1988).

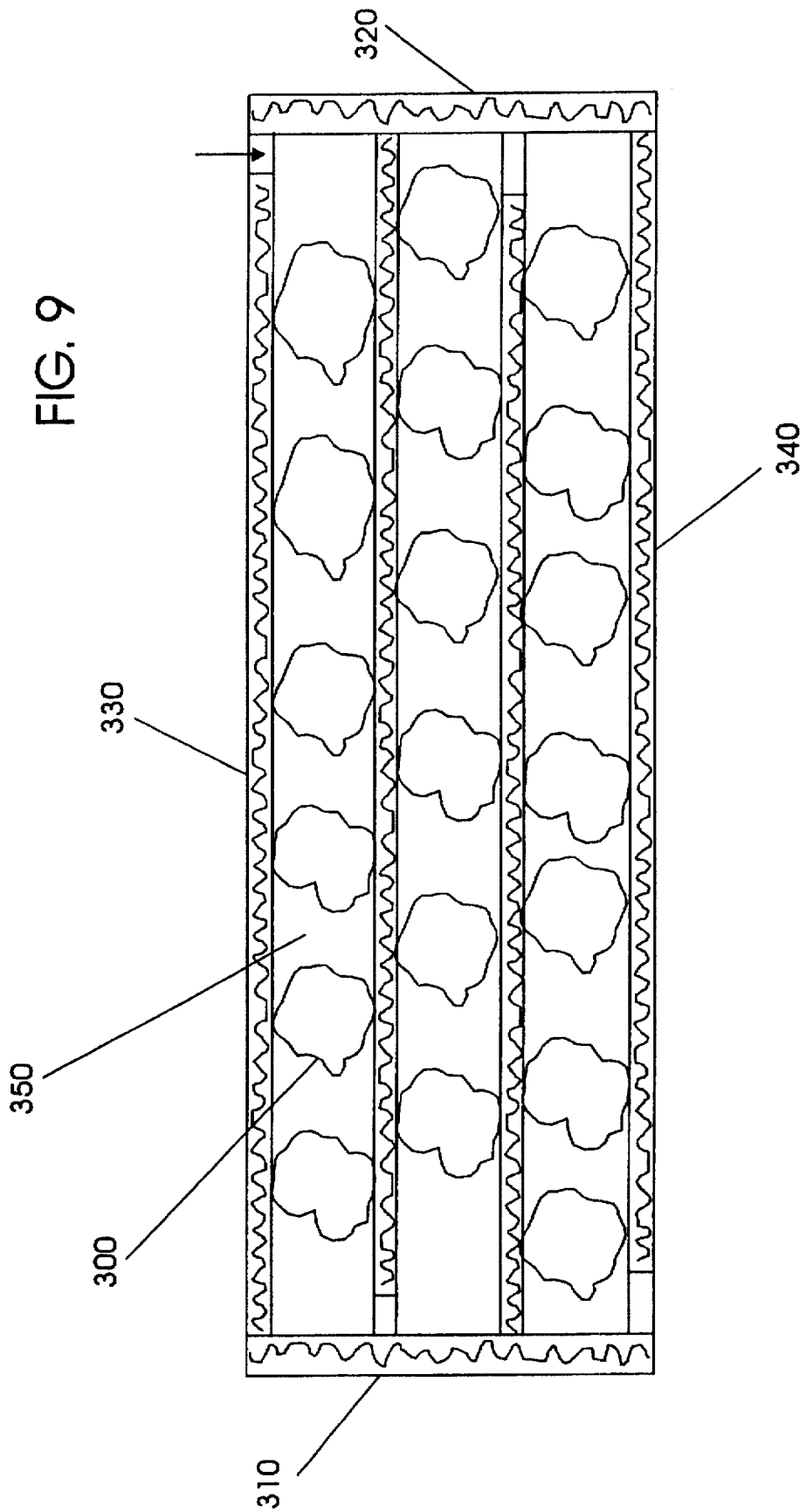

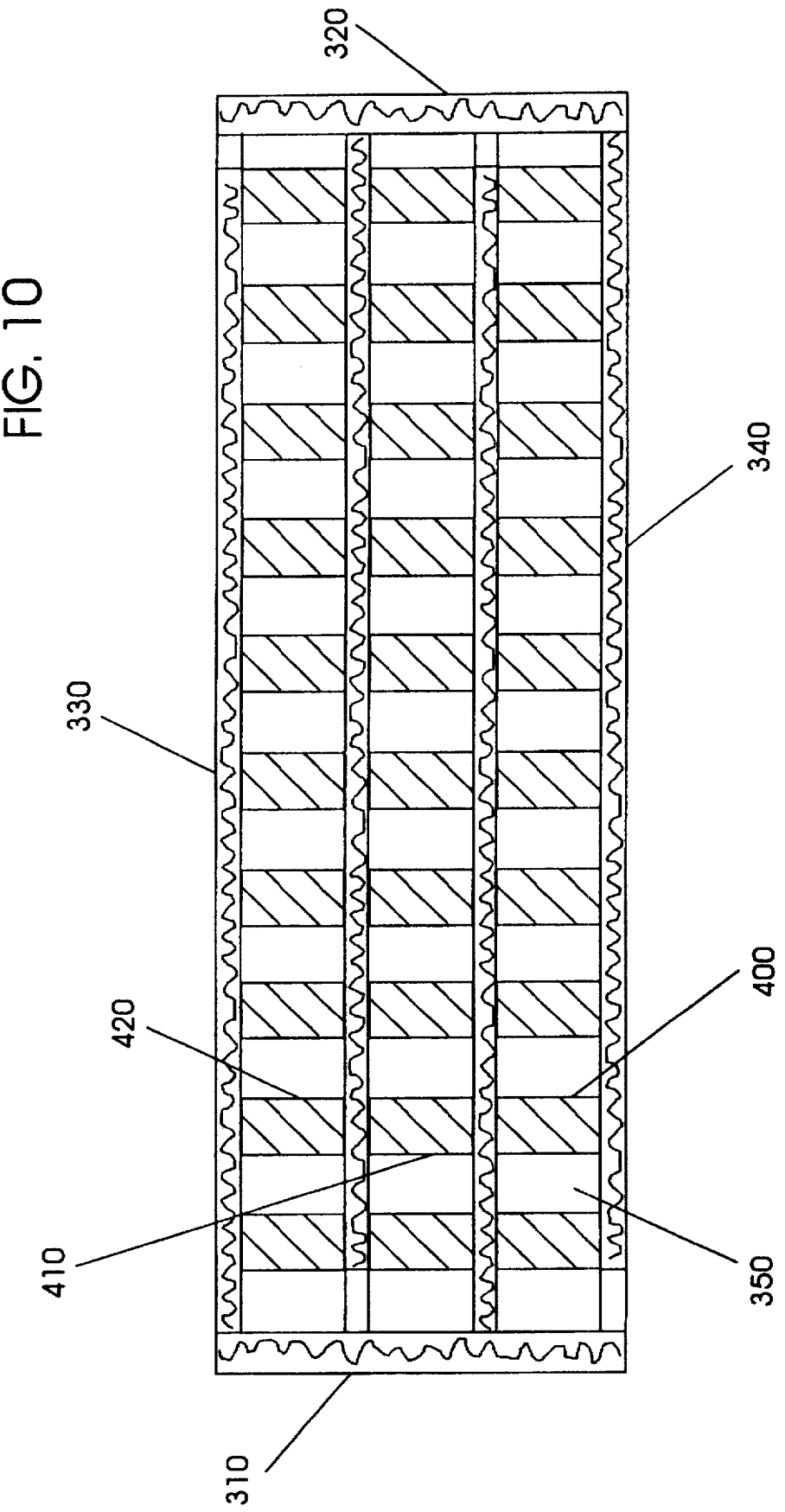

ULTRASOUND TRANSDUCER ARRAY WITH TRANSMITTER/RECEIVER INTEGRATED CIRCUITRY

This application is a continuation of application Ser. No. 08/227,047, filed Apr. 13, 1994, now abandoned, and a continuation-in-part of U.S. application Ser. No. 07/883,006 now issued as U.S. Pat. No. 5,311,095 filed May 14, 1992 and a continuation-in-part of U.S. application Ser. No. 07/962,455 now issued as U.S. Pat. No. 5,329,496 filed Oct. 16, 1992.

FIELD OF THE INVENTION

This application relates generally to the fields of medical diagnostic ultrasound, underwater acoustic imaging, and the associated piezoelectric transducers and ultrasonic scanners.

BACKGROUND OF THE INVENTION

Diagnostic ultrasound is an essential modality in virtually every medical specialty and particularly in obstetrics, cardiology and radiology. The ultrasound transducer is the critical component and the limiting factor affecting the quality of diagnostic ultrasound imaging and Doppler measurements. In a conventional circular piston piezoelectric transducer used in mechanical scanning for medical applications (e.g., 19 mm diameter, 3.5 MHz resonant frequency) the electrical impedance of the transducer is approximately 50Ω. Such a transducer is well matched to the conventional electrical transmit circuit for delivering large amounts of acoustic power to the tissue load during the transmit mode. In a like manner, in receive mode, such a transducer is well suited for driving the typical 50Ω or 75Ω coaxial cable connected to the amplifier circuits of the scanning system.

The most sophisticated medical ultrasound scanners now typically use (N×1) linear arrays containing over a hundred transducer elements which may be multiplexed and/or electronically steered and focused via phased array techniques. A linear array transducer for phased array scanning, typically employs much smaller array elements than the conventional transducer described above. For example, a typical linear array includes 128 elements, each of which is 0.2 mm wide by 10 mm long with a resonant frequency of 3.5 MHz. Each piezoelectric ceramic transducer element in a linear array acts as a capacitor of approximately 150 picofarads (pf), which produces an electrical impedance $Z=R_a+jX$ where $X\approx 300\Omega$ at 3.5 MHz. At resonance the reactive component is in series with the radiation resistance $R_a$, which is roughly the same magnitude as X. These higher impedance elements reduce the sensitivity of the transducer for medical ultrasound scanning. The higher impedance element creates an impedance mismatch with conventional transmit circuitry in transmit mode, thus reducing acoustic power transmitted into the patient's body. In receive mode, the high impedance array element suffers significant losses when trying to drive conventional coaxial cable characterized by its capacitance/length.

It has been a significant challenge for the ultrasound community to design and fabricate linear phased arrays for medical ultrasound over the past two decades. Three performance characteristics have established conventional size and geometry of the transducer array elements: (1) the elements have sufficient angular sensitivity to steer the phased array over a ±45° sector angle; (2) The arrays suppress grating lobe artifacts by fine inter-element spacing; and (3) the width of each rectangular element is small compared to the transducer thickness to remove parasitic lateral mode vibrations from the desired transducer pass band. Adherence to these performance characteristics have produced linear arrays having long narrow elements which are sized to be less than one wavelength wide for the ultrasonic frequencies used in tissue imaging, (e.g., <0.3 mm wide×10 mm long at 3.5 MHz).

Two dimensional (N×M) transducer arrays are believed to hold promise in improving clinical image quality in future diagnostic ultrasound equipment. An immediate clinical application of 2-D phased arrays is the reduction of image slice thickness by focusing in the elevation plane perpendicular to the scanning dimension. An additional application of 2-D transducer arrays is the correction of phase aberrations introduced across the transducer aperture by tissue inhomogeneities. These aberrations occur in two dimensions, so 2-D arrays combined with the proper phase correction signal processing can restore diagnostic image quality. In addition to improving conventional ultrasound B-scan image quality, two-dimensional transducer arrays should assist in the development of new modes of ultrasound imaging. Projected new techniques include: (1) presentation of simultaneous orthogonal B-mode scans; (2) acquisition of several B-scans electronically steered in the elevation direction; (3) development of high-speed C-scans; and (4) high-speed volumetric ultrasound scanning to enable real time three-dimensional imaging and volumetric, angle-independent flow imaging. With known technology, these techniques can only be implemented with 2-D array transducers.

Unfortunately, the design and fabrication problems of one-dimensional transducer arrays become almost overwhelming when extended to a two dimensional array, in which case the element size may be less than 0.2 mm×0.2 mm for more than 1000 elements in the array. There are two significant obstacles which limit the use of 2-D transducer arrays. First, a simple fabrication method for the electrical connections to such array elements, which can be less than one ultrasound wavelength on a side, is not known. Second, it is very difficult to achieve adequate sensitivity and bandwidth from such small elements.

In the last 15 years there have been several descriptions of prototype 2-D array transducers for medical ultrasonic imaging, but the resulting products were acoustically unsuitable for modern medical ultrasound imaging procedures.

Two dimensional arrays also have been confronted with the problem of high electrical impedance in transducer elements. Two-dimensional arrays have been developed in two geometries. A typical geometry for a 4×32 array transducer is designed for focusing (but not steering) in the elevation direction and for correction of phase aberrations in two dimensions. Such transducers have been called 1.5-D arrays. For a transducer array of this design, each element typically exhibits complex impedance, the magnitude of which is approximately 1000Ω at a resonance of 3.5 MHz; this complex impedance causes an electrical impedance mismatch and the accompanying sensitivity decrease which are more severe than seen in linear arrays. Elements in full 2-D arrays which can steer the ultrasound beam in azimuth as well as elevation may be smaller than 0.2 mm×0.2 mm; these elements exhibit a complex electrical impedance having a magnitude of approximately 5000Ω or greater, so sensitivity is further reduced. Thus, for 1.5-D and 2-D arrays, the development of suitable piezoelectric materials are critical to improved sensitivity.

Unfortunately, the piezoelectric ceramics as described in the prior art are ill suited for such transducers. 1.5-D and 2-D arrays are commonly fabricated by dicing a single piezoelectric chip in two directions with a kerf width as small as 0.01 mm.

In an attempt to address the problem of high electrical impedance in linear arrays, U.S. Pat. No. 4,958,327 to Saitoh et al., teaches the concept of a multi-layer ceramic piezoelectric material consisting of K layers laminated in parallel electrically but in series acoustically. For K layers of uniform thickness, the capacitance of each element is increased by $K^2$; this capacitive increase reduces the electrical impedance of the element by $K^2$ significantly improving transmit efficiency and receive mode sensitivity. However, the teaching of Saitoh is inapplicable to two dimensional arrays; as the electrode layers are short circuited on a side surface of an element, the concept is limited to elements with electrode layers having a surface on the periphery of the transducer, and cannot be used for the elements of the inner rows of two dimensional arrays.

Transducers may be developed using a piezoelectric substrate fabricated from a composite of a piezoelectric ceramic phase such as PZT and an inert phase such as a polymer epoxy. However, piezoelectric composites produce a lower relative dielectric constant than PZT alone due to the presence of the epoxy phase. The lower dielectric constant results in a lower capacitance and thus a higher electrical impedance than PZT. The higher electrical impedance has limited the use of PZT/epoxy composites in the small elements of steered linear phased arrays and two dimensional arrays. Moreover, the lower dielectric constant exacerbates the high impedance problem of two dimensional array elements described above.

It has also long been a goal in the field of medical ultrasound to include as much as possible of the scanner electronics into the ultrasonic transducer handle. In the 1970's, manufacturers of commercial medical ultrasound scanners who used large linear array transducers incorporated electromechanical relay switches in the transducer handles to switch the transmit and receive signals along the length of the transducer array (e.g. ADR Corp., Tempe, Az.). However, these relays were too large and consumed too much power to be used in the current generation of transducer arrays. Instead, the transmit switches, i.e., multiplexers (MUX) have been moved back to the scanner rack. The high voltage switches (80–200V) typically used are Supertex HV22 analog switches.

Locating multiplexers in the rack of the ultrasound necessitates a separate coaxial cable for each element in the array transducer. This requirement significantly increases the cost of the transducer assembly. In addition, as ultrasound scanners become more complex and approach the use of 1000 element arrays, the cabling will present serious problems in flexibility, size, and ease of clinical use. For a conventional phased array scanner, sequential linear array, curvilinear array, or synthetic aperture scanner, if one assumes an N element array transducer, K transmit circuits and N:K transmit multiplexers in the scanner rack, L receiver/delay circuits and N:L receive multiplexers in the rack, then N coaxial cables are required to connect the transducer to the system which also includes the signal processing block, the computer controller, high voltage power supply and display. For example, a 512 element array system may include 128 transmit circuits, 512:128, i.e. 4:1 high voltage transmit multiplexers, 64 receive channels including 64 delay lines, and 512:64, i.e. 8:1 receive multiplexers.

Since the 1970's, the subsequent progress in the area of front end circuit integration for the transducer has been limited to receive mode. For example, 16 discrete component FET pre-amplifiers have been included in the transducer handle of a 16 channel phased array ultrasound scanner. Swartz and Plummer (*IEEE Trans. Electronic Devices*, 26, 1921–1931) have described MOSFET preamplifiers integrated with polymer ultrasound transducers. Mo, et al., (*IEEE Trans. Electronic Devices*, 37, 134–140) described an improved design of this concept using silicon micromachining to reduce crosstalk. In 1990, Paulos described an integrated circuit consisting of 16 receive mode pre-amplifier channels using bipolar transistors (Goldberg et al., *Ultrasonic Imaging*, 17, 234–248). Finally, U.S. Pat. No. 5,271,403 described a split-cascode multichannel preamplifier/multiplexer integrated circuit to be mounted in the transducer handle. The '403 patent, however, only enables receive mode switching of the low voltage ultrasound echoes between groups of elements in transducer arrays.

Unfortunately, the development of low voltage receiver/multiplexers in the handle will not reduce the required number of coaxial cables since N cables are still needed for the transmit circuitry. What is required is a method of including electronic transmitters and transmit multiplexers in the transducer handle along with the receivers. One option, as suggested by Robinson and Mo (*IEEE Ultrasonics Symposium*, 1992), is to develop high voltage transmitters in an integrated circuit. However, the power and size requirement of such high voltage circuits (80–200V) have precluded integration of such devices. It has proven to be very difficult to develop high voltage integrated circuit transmitters. It has proven to be even more difficult to develop high voltage transmitter/multiplexer and low voltage receiver preamplifiers/multiplexers in the same integrated circuit.

In view of the foregoing, it is an object of the present invention to provide an ultrasonic transducer assembly which reduces the number of cables required.

An additional object of the present invention is to provide an ultrasonic transducer assembly which includes both receive and transmit circuitry in the assembly. An additional object of the present invention is to provide an ultrasonic transducer assembly having circuitry to generate and control the transmission and reception of ultrasonic pulses.

It is an additional object of the invention to provide ultrasound diagnostic devices which utilize a transducer assembly as described.

SUMMARY OF THE INVENTION

These and other objects are satisfied by the present invention, which includes as a first aspect an ultrasonic transducer assembly having a connector with an upper surface, a lower surface and an array of connector pads for electrically connecting the upper surface to said lower surface. The transducer assembly includes an ultrasonic transducer chip mounted on the upper surface of the connector. The ultrasonic transducer chip is divided into a plurality of transducer elements, which are divided into a set of transmit transducer elements and a set of receive transducer elements. These sets of transducer elements are electrically connected to the lower surface of the connector. The transducer assembly also includes transmit circuitry integral with the transducer assembly and operably associated with the transmit set of transducer elements for selectively providing an electrical signal to at least a preselected one of the transmit set of transducer elements to generate an ultrasonic pulse. Finally, in this aspect of the present invention, the transducer assembly includes receive circuitry integral with the transducer assembly and operably associated with the receive set of transducer elements for selecting an electrical signal corresponding to an ultrasonic signal from a target received by a selected one of the receive set of transducer elements.

In other aspects of the present invention, the plurality of transducer elements are arranged in a two-dimensional array or the transmit set of transducer elements are multi-layer transducer elements or the transmit circuitry includes circuitry for controlling the generation of the ultrasonic pulse.

An additional aspect of the present invention includes an ultrasonic scanner incorporating the transducer assembly described above.

BRIEF DESCRIPTION OF THE DRAWINGS

FIG. 9 is a cross-sectional view of a transducer element according to the present invention prior to heat curing the piezoelectric composite.

FIG. 10 is a cross-sectional view of a piezoelectric composite transducer element according to the present invention.

DETAILED DESCRIPTION OF THE INVENTION

The present invention provides a two-dimensional ultrasound transducer array having improved sensitivity with small transducer elements. It does so by providing a transducer chip with multiple piezoelectric layers which can be fabricated using multi-layer ceramic (MLC) technology. Alternate piezoelectric layers are electrically connected through the use of "vias."

Figure 1:
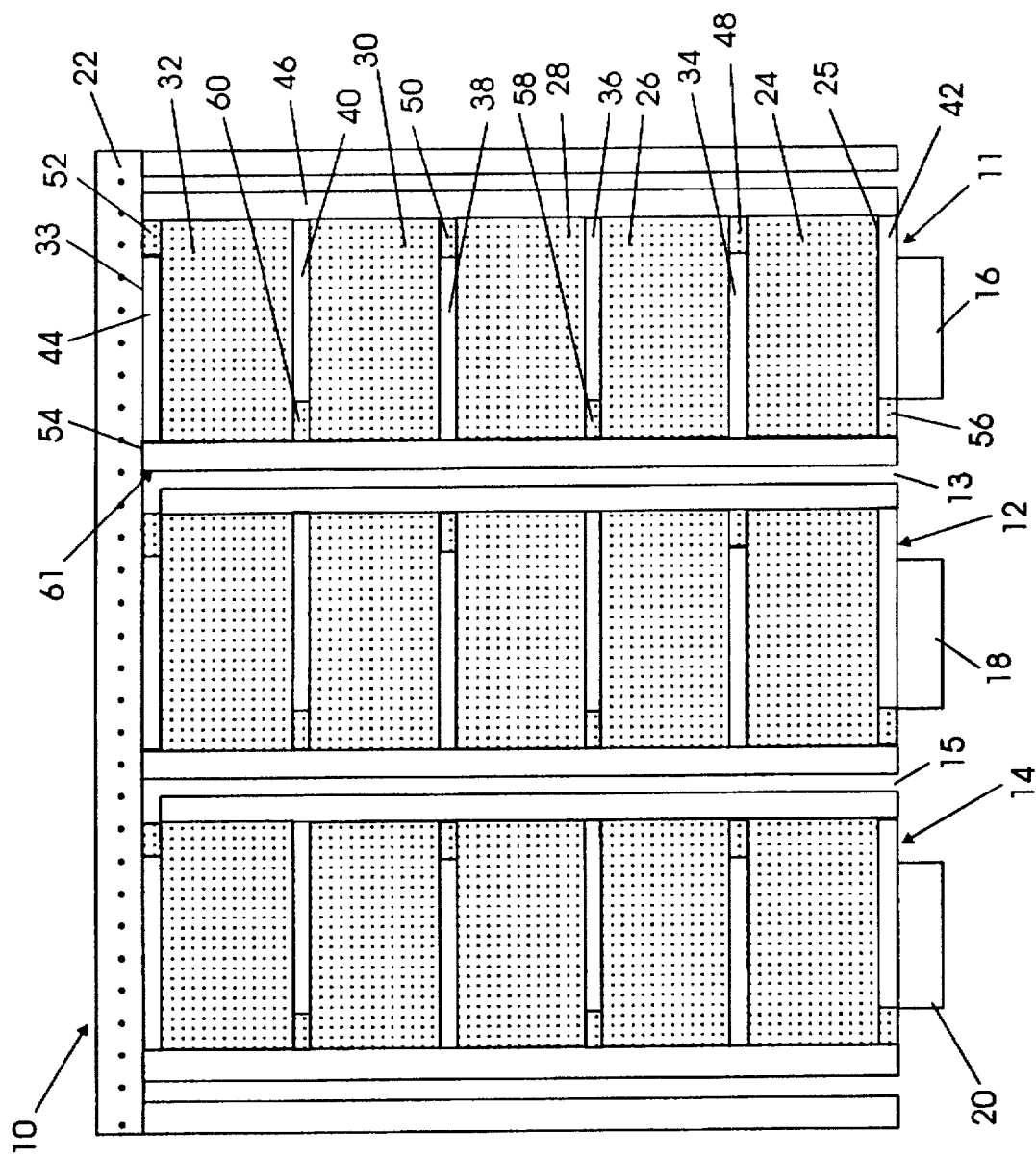
FIG. 1 is a side cross-sectional view of a 3×3 two dimensional transducer array with five piezoelectric layers.
Figure 2:
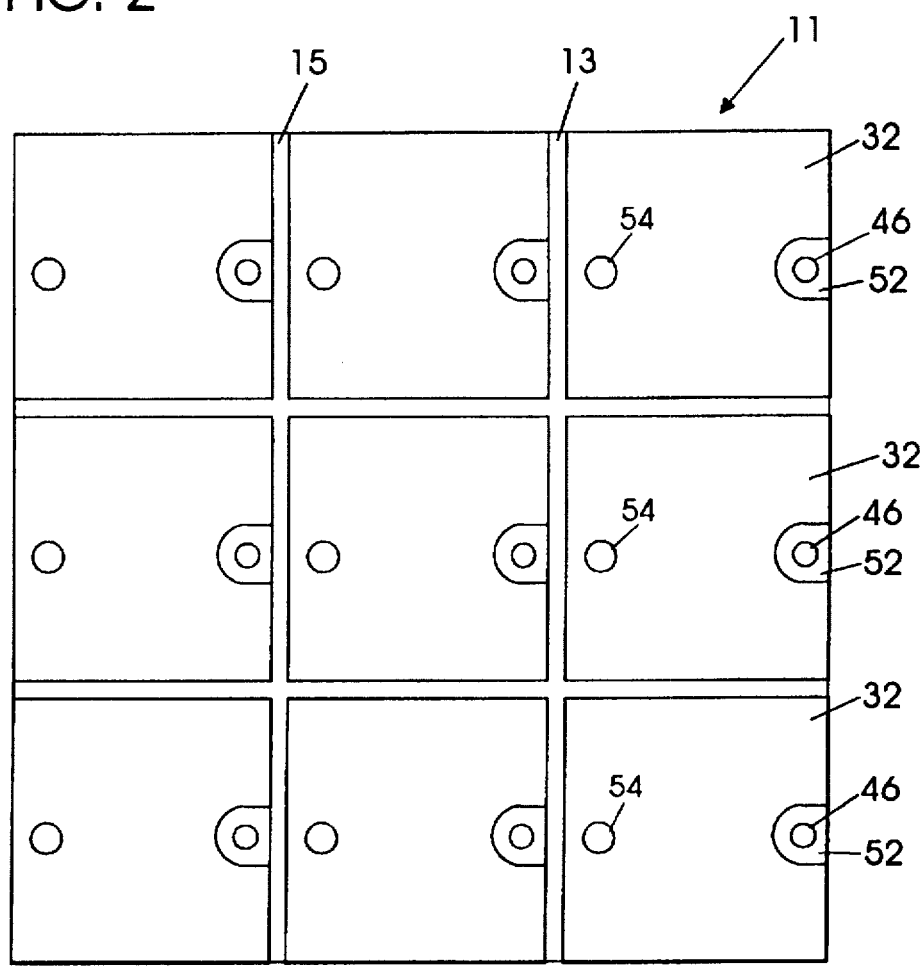
FIG. 2 is a top view of a 3×3 two dimensional transducer array.

An exemplary embodiment of a transducer chip of the present invention is illustrated in FIGS. 1 and 2, which show schematically a transducer chip 10 comprising a 3×3 array of transducer elements. Those skilled in this art will recognize that the invention is not restricted to arrays of this size, but can include any two dimensional transducer array, which as used herein refers to a transducer having a plurality of elements arranged in a plurality of rows (N) and a plurality of columns (M) in a rectangular N×M grid or any arbitrary array pattern.

FIG. 1 shows three adjacent transducer elements 11, 12, and 14, each of which is separated from the adjacent transducer element by a kerf 13, 15. Each kerf 13, 15 can be filled with air or with some filler material such as polymers, epoxies, glass balloons, plastic balloons, and the like. Each transducer element 11, 12, 14 is electrically connected to a corresponding connector pad 16, 18, 20. Each of the transducer elements 11, 12, and 14 comprises five piezoelectric layers (illustrated for element 11 as layers 24, 26, 28, 30, 32) arranged in a vertical stack. Those skilled in this art will appreciate that although five piezoelectric layers are shown herein, any number of piezoelectric layers can be included. Each of the piezoelectric layers 24, 26, 28, 30, 32 is separated from its adjacent layers by an electrode layer (illustrated as layers 34, 36, 38, 40. An additional electrode layer 42 contacts the lower surface 25 of the lowermost piezoelectric layer 24, and also contacts the connector pad 16. Likewise, an additional electrode layer 44 contacts the upper surface 33 of the uppermost piezoelectric layer 32, and also contacts a ground plate 22 which covers all of the transducer elements.

Alternate electrode layers 42, 36, and 40 are electrically connected by a "via" 46, which as used herein is an electrical connection which extends through an aperture in the layers of a multilayer substrate to electrically connect certain of the layers of the element. In the present embodiment, the via 46 extends from just beneath electrode layer 44 to electrode layer 42 and contacts electrode layers 36 and 40, thereby connecting these layers. The via 46 is insulated from connection with electrode layers 34, 38, and 44 by insulation gaps 48, 50 and 52. In the same manner, via 54 connects electrode layers 34, 38, and 44 by extending along an internal surface 61 of the transducer element 11 from electrode layer 44 to an insulation gap 56 which insulates the via 54 from electrode layer 42. As used herein, an "internal surface" of a transducer element is a surface which adjacently faces another element in another row or column across the kerf 13, as opposed to serving as the peripheral surface of the array and thus being easily accessible for connection. Insulation gaps 58 and 60 insulate the via 54 from the electrode layers 36 and 40 respectively.

The two-dimensional nature of the transducer chip 10 can be best seen in FIG. 2, which shows the chip at the depth of electrode layer 44. The vias 54 each extend to and thus electrically connect this electrode layer. In contrast, the presence of the insulation gaps 52 prevents the vias 46 from electrically connecting with this electrode layer. The same configuration would be seen at electrode layers 34 and 38. For electrode layers 42, 36, and 40, the insulation gaps 56, 58, and 60 prevent electrical connection between the vias 54 and these electrode layer, but vias 46 do connect these electrode layers. Although they are shown herein to be located on the internal surfaces of the transducer elements, it is to be understood that the vias of the present invention can be prepositioned during fabrication so they can be located at any desired point on each element, such as an internal surface or even within the interior volume of the element. As used herein, a via which is located on an internal surface or within the interior volume of an element is referred to as an "internal via."

The interconnection of the first set of alternating electrode layers 42, 36, 40 by a first via 46 and the interconnection by a second via 54 of a second set of alternating electrode layers 34, 38, 44 interposed between the first set of alternating electrode layers provides an element which comprises five capacitive elements connected in parallel. As a result, the capacitance of the total transducer element 11 is increased over a single piezoelectric layer of the same thickness as the total stack by the square of the number of layers; i.e., in this instance by $5^2=25$. Accordingly, the impedance of this element is reduced by that same factor, which improves the impedance match of these elements to electrical sources to which they are typically attached.

As those skilled in this art will appreciate, the number and thickness of piezoelectric layers in an element can vary depending on the character of the connecting device. In a preferred embodiment, the piezoelectric layers of a transducer chip 10 can be between about 0.01 and 0.15 mm in thickness, and more preferably can be between about 0.02 and 0.06 mm in thickness. As an example, to achieve a resonant frequency of 2.5 MHz in a conventional 2-D array transducer, a PZT chip of thickness of about 0.6 mm is required. A typical MLC-produced piezoelectric layer thickness is 0.04 mm after sintering, so K=11 layers can be easily included in a 2.5 MHz chip. Thus, the capacitance of each layer of the MLC element would be increased by a factor of 11 and the capacitance of the complete stack of 11 capacitors in parallel for a single element will be increased by $K^2=11^2=121$. The element impedance is then reduced by a factor of 121 from 5 KΩ to 41 Ω, an excellent match to a 50 Ω electrical source.

The present invention may be used over a wide range of operating frequencies of from about 1 MHz to about 10 MHz and above. The physical dimensions and number of elements in the two-dimensional array will depend upon the application of the transducer array. For example, a square array of square transducer elements can be utilized for three dimensional imaging systems. Square transducer elements of from about 0.05 mm to about 1 mm are suitable for three dimensional imaging using frequencies of from about 10 MHz to about 1 MHz. However as smaller dimensions are utilized, operating frequencies of greater than 10 MHz may be achieved. The desired frequency of ultrasound determines the height of the chip; for example, for a 20 MHz signal, the chip can be ≈0.05 mm, and for a 1 MHz signal, the chip can be ≈1 mm. The thickness of the chip then determines the depth of the kerf.

Figure 3A:
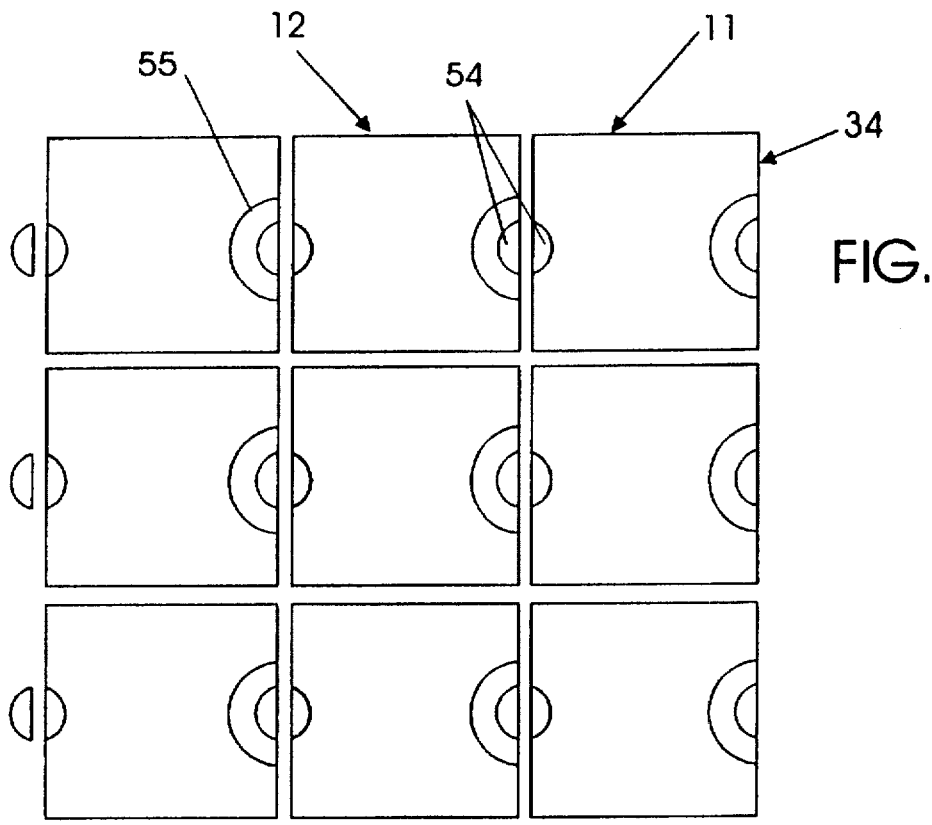
FIG. 3A is a top section view of a two dimensional array having split vias taken through an electrode layer of a first set of alternating electrode layers.
Figure 3B:
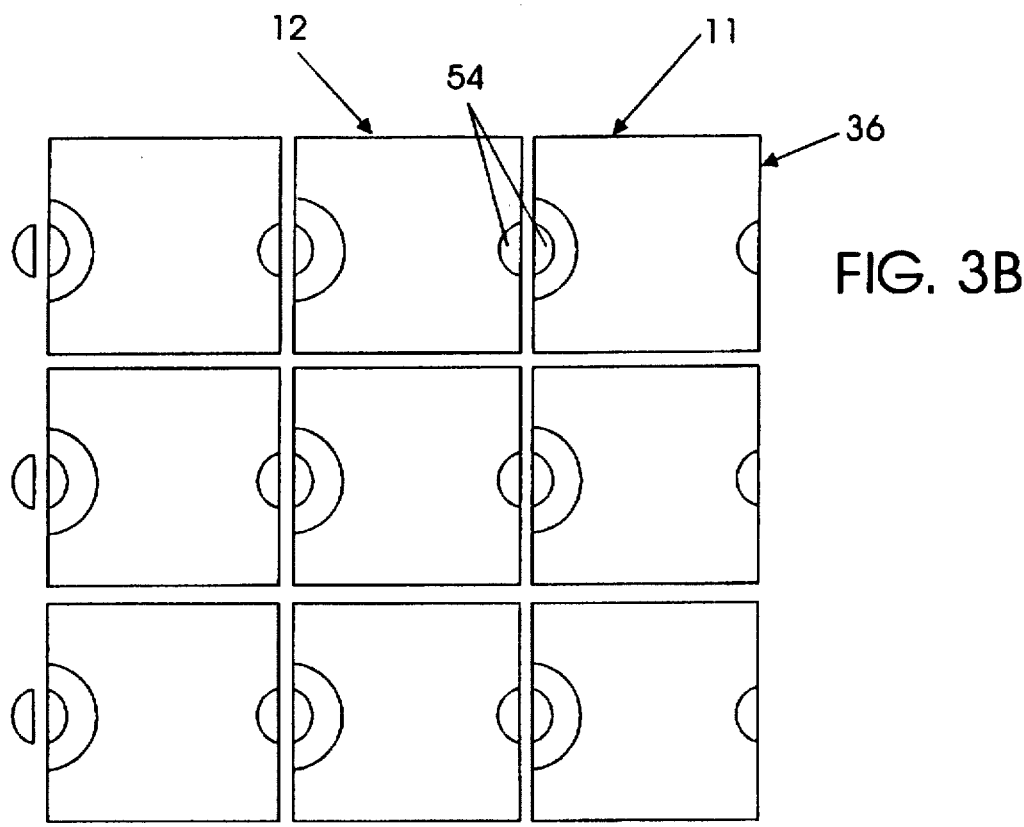
FIG. 3B is a top section view of a two dimensional array having split vias taken through an electrode layer of a second set of alternating electrode layers interposed between the first set of electrode layers of FIG. 3A.

In an alternative embodiment, each circular via in FIG. 2 can be split, as shown in FIGS. 3A and 3B, which illustrate electrode layers 34, 38, 44 (FIG. 3A) and electrode layers 42, 36, 40 (FIG. 3B). The result is a transducer chip wherein a single circular via 54 can independently connect electrode layers 34, 38, 44 on the left edge of element 11 (FIG. 3A) as well as independently connecting layers 42, 36, 40 on the right edge of element 12 (3B). In this configuration, a single via is able to serve two independent elements. This design feature of splitting each via offers the additional advantage that one side of each split via is grounded so that two signal vias are not immediately adjacent separated only by the saw kerf. This design will reduce electrical cross talk in the piezoelectric MLC.

In an alternative embodiment to the foregoing, for fabrication reasons it may be advantageous for a split via, rather than having one half of the split via in contact with the electrode layer of one element and the other half of the split via insulated from the same electrode layer on the adjacent element, instead to comprise halves which are mirror images of one another about a plane defined by the center of the kerf separating the adjacent elements. Thus in FIG. 3A, via 54 would be in contact with electrode layer 34 on both element 11 and element 12. Split via 55, located on the other (leftmost in FIG. 3A) surface of element 12, would then be insulated from electrode layer 34 by an insulation gap. This pattern would continue for the other electrode layers 38, 44 in contact with electrode layer 34 and for other elements of the array. In a similar fashion, for electrode layer 36 shown in FIG. 3B, the half of split via 54 associated with element 12 (the left half in FIG. 3B) would be insulated from electrode layer 36 by an insulation gap which mirrors that shown for element 11. On the leftmost edge of element 12, the split via would be in contact with the electrode layer. The same pattern would be followed for electrode layers 42, 40.

Figure 4:
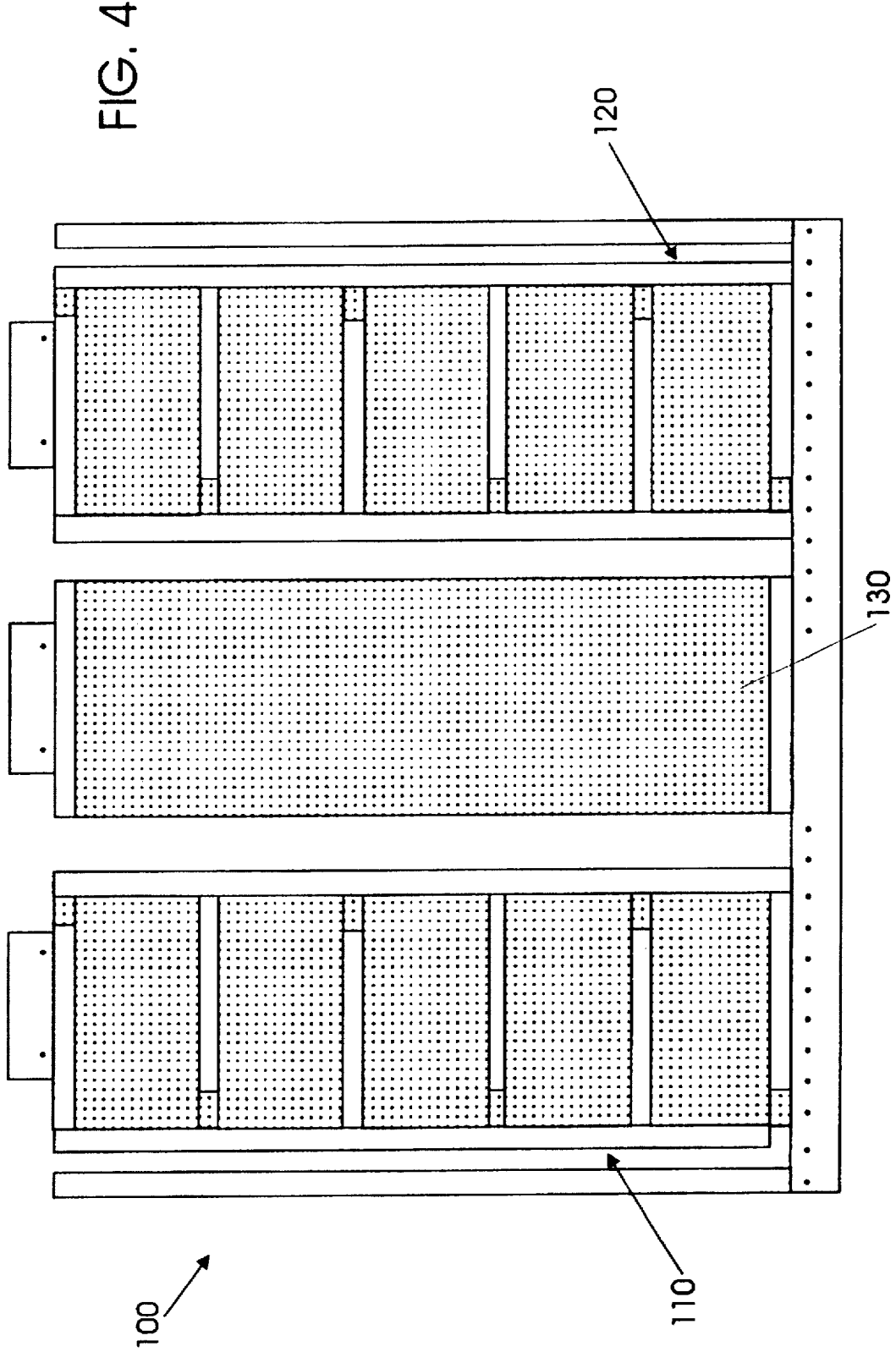
FIG. 4 is a side cross-sectional view of a 3×3 two dimensional transducer array with two elements having five piezoelectric layers and one single layer element.

An additional alternative embodiment is schematically illustrated in FIG. 4 as a three-element two-dimensional array. A transducer chip 100 comprises two multilayer elements 110, 120 similar in configuration to those described above, and an element 130 comprising a single piezoelectric layer 130. By mixing a plurality of single layer elements and plurality of multilayer elements within the same two-dimensional array, the pulse-echo sensitivity of the transducer can be improved further.

Fabrication of a MLC piezoelectric chip, which is based on computer aided design, proceeds as follows. PZT powder is mixed with organic binders, plasticizers, and solvents to form a slurry. The slurry is spread to form a thin layer and heated to form a so-called "green tape." Slurry thickness is controlled using a doctor blade technique; exemplary is a green tape thickness of between 0.05 and 0.15 mm. Multiple holes are punched (mechanically or by laser), drilled, or etched into the tape to form the vias on each layer. The via holes are filled with a metal paste (e.g. silver or platinum) and the surface electrodes (silver or platinum paste) for each layer are laid down by screen printing excluding the insulation gaps. Multiple layers of green tape are then superimposed to align the vias, the multi-layer sandwich is laminated and then finally sintered to form a single package. Metallization is then plated or vacuum deposited on the input pads.

This transducer chip 10 then can be attached to a substrate containing electrical contact pads 16, 18 and 20 using any number of methods of bonding techniques. One such bonding technique uses conductive epoxy for a resistive contact. Another bonding technique uses a thin film approximately 1 micron thick of nonconductive epoxy for a capacitive contact. The electrical contact pads are connected to wires or vias in a multi-layer ceramic connector, traces on a circuit board, or a polymer circuit material which may be flexible. Optional conductive films can be deposited onto the piezoelectric chip 10 to produce a plurality of $\lambda/4$ matching layers to tissue.

This structure can then be divided into a plurality of transducer elements by any procedure which creates separate piezoelectric elements, such as dicing with a dicing saw. Dicing may be carried out using K & S Diamond Wheel Dicing Saw which produces kerf widths about 25 microns. The size and shape of the transducer elements is determined by the dicing pattern and is typically a square or checkerboard pattern. However other patterns such as parallelograms, circles and rhombuses may be used depending upon the specific application of the transducer array. The actual configuration of the transducer array, however, may be selected by selectively establishing electrical connections to specific transducer elements in the checkerboard, by selective placement of connector pads or vias or by other electrical means. Active transducers may be configured by virtue of said selective connections in any number of predetermined patterns such as a cross, a filled or unfilled rectangle or a filled or unfilled circle. Note that through selection of active transducer elements, the patterns for the send transducers may be the same or different from the pattern for the receive transducers. As a final step, the ground plate 22, usually a conductive foil, is then bonded to the piezoelectric chip 10 with a bonding agent.

An exemplary chip of the present invention formed by this method is 16 layers of PZT-5A, each layer being 0.08 mm thick, to yield a stack thickness of 1.3 mm (assuming 20 percent shrinkage during sintering). This stack has a resonant frequency of about 1.0 MHz.

Figure 5:
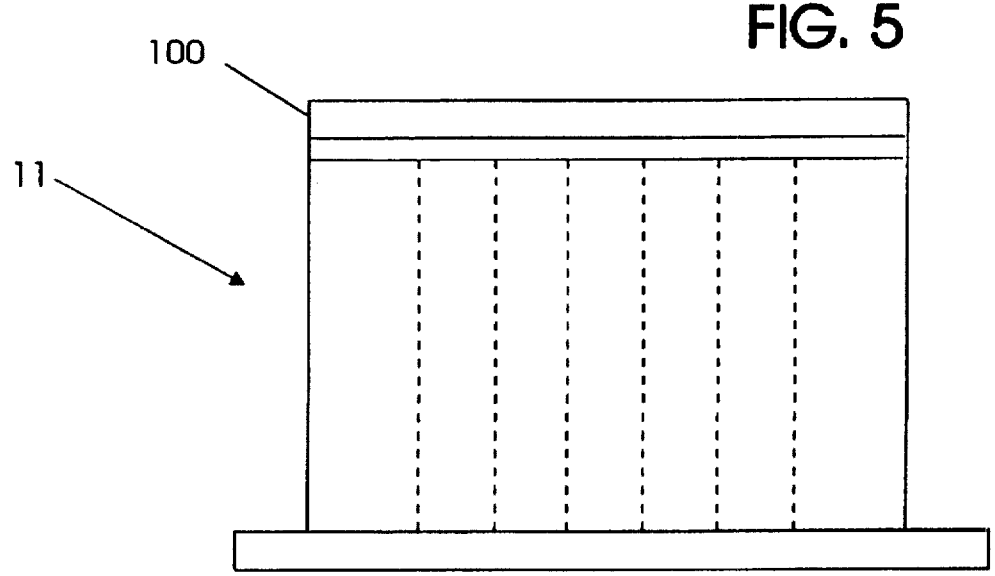
FIG. 5 is a cross-sectional view of a two-dimensional array including an upper stand-off for improved image quality obtained by direct contact of the transducer on a subject's skin.

FIG. 5 shows an alternate embodiment of the present invention which includes a stand-off 100 to allow improved use of the present invention for medical imaging applications by allowing improved contact with the skin surface of a patient for small acoustic windows on the body such as the inter-costal space between the ribs for cardiac ultrasound diagnosis. This stand-off may be fabricated using conventional technology.

Optionally, as will be described in further detail below, the two-dimensional array ultrasonic transducer of the present invention may have means for redistributing the electrical connections of the connection pads 16, 18, 20 so as to increase the distance between electrical connections to a greater distance than that between individual connector pads 16, 18, 20. This increase in spacing between electrical connections allows for simpler connection to external electronics such as voltage sources and input amplifiers. The increased spacing allows for the use of coaxial connections between the transducer array and the external electronics which results in reduced noise in the electrical output from the transducer and thereby increases the usable sensitivity of the transducer array. The increased spacing is accomplished through conventional bond wiring, circuit boards, polymer circuits which may be flexible, or the use of MLC technology.

Figure 6:
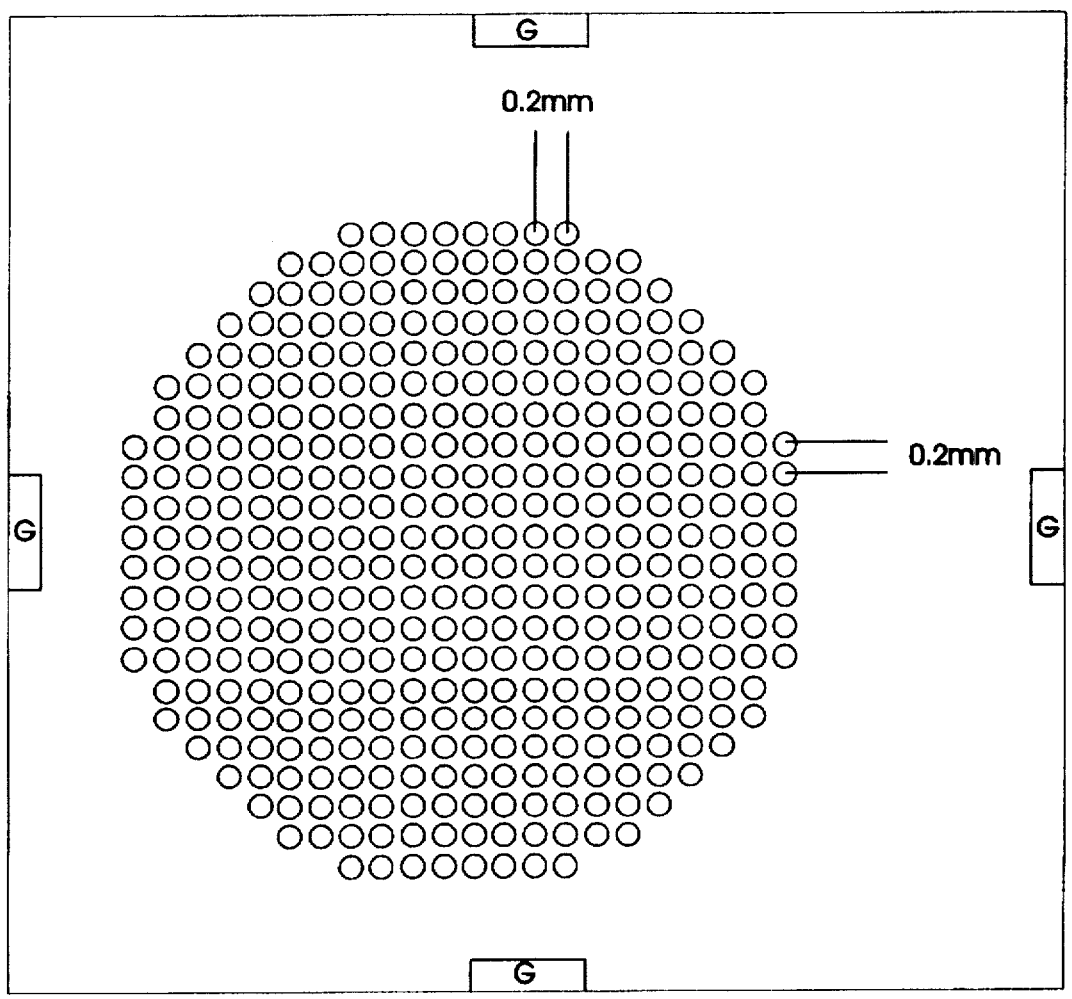
FIG. 6 is a top view of the footprint of a transducer to be incorporated into a handle for easier use.
Figure 7:
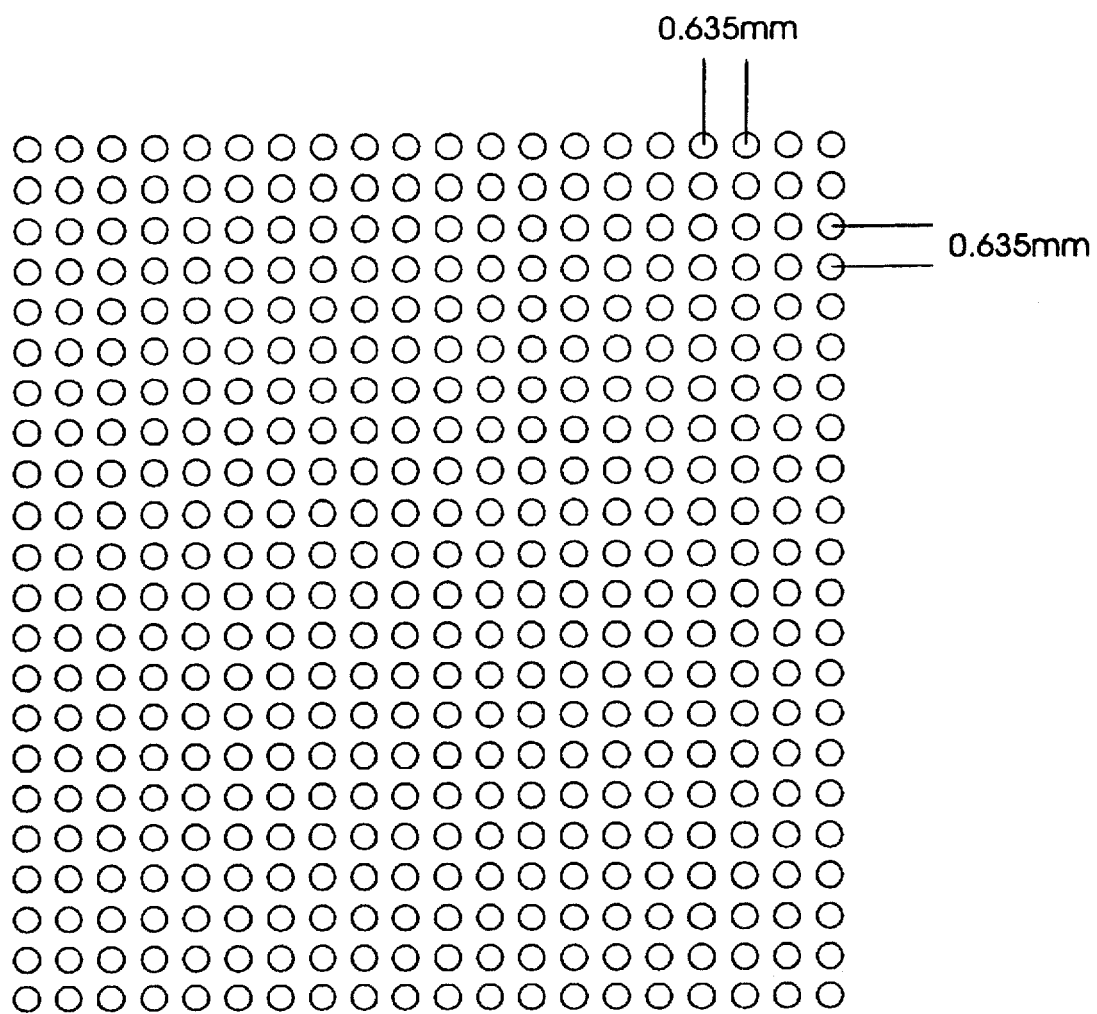
FIG. 7 is a bottom view of the transducer of FIG. 6 showing wider interelement spacing.

The two dimensional array ultrasonic transducer of the present invention may also be incorporated into a handle for easier use in medical and other applications. An example of the top view of the transducer is shown in FIG. 6, in which the interelement transducer spacing is 0.2 mm so that the total footprint on the skin surface is only a 5 mm×5 mm square. FIG. 7 shows the bottom view of the transducer of FIG. 6 and shows a flange containing a pad grid array for connection to an optional transducer handle. The interelement spacing of the pads is 0.635 mm so that a redistribution, or fan-out, occurs in the connector, thereby enabling easier electrical connection to the cables of the transducer handle.

Figure 8:
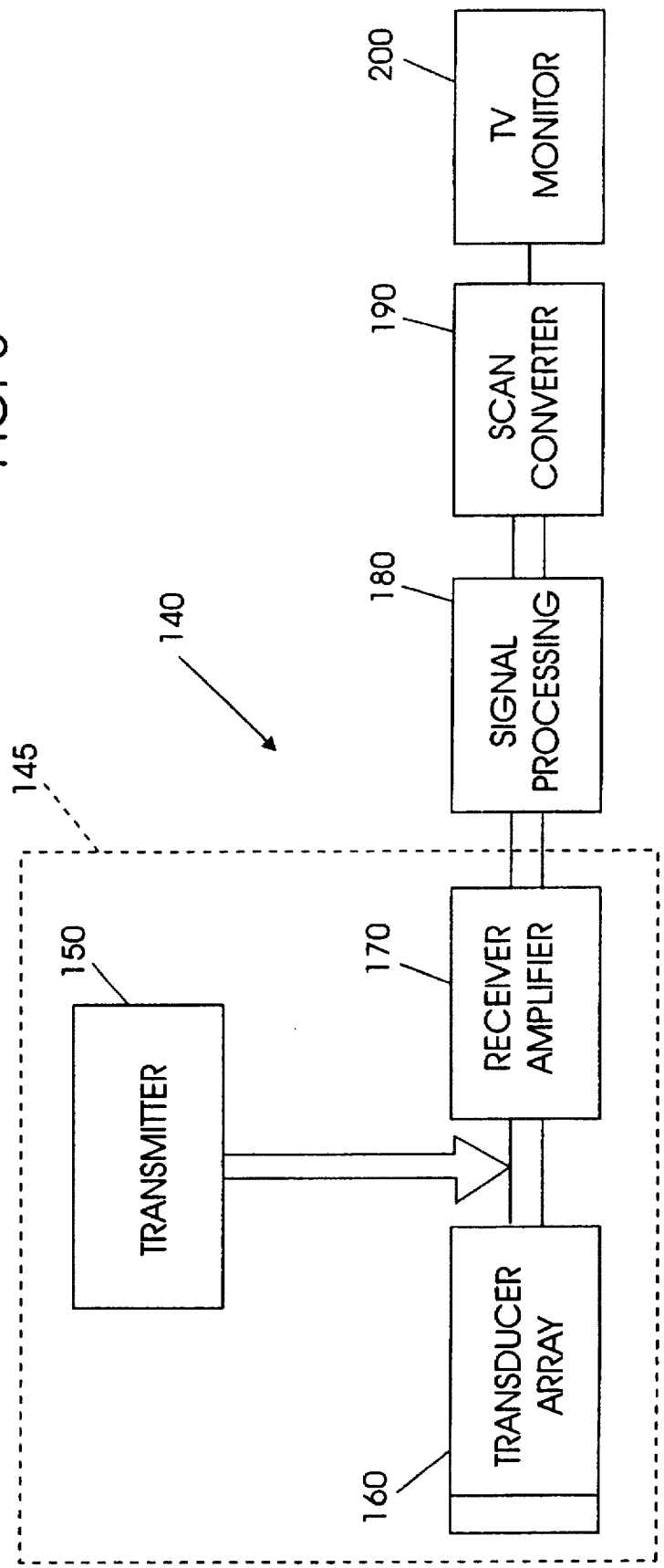
FIG. 8 is a block diagram showing the electrical connections of an ultrasonic scanner for medical diagnostic use.
Figure 11A:
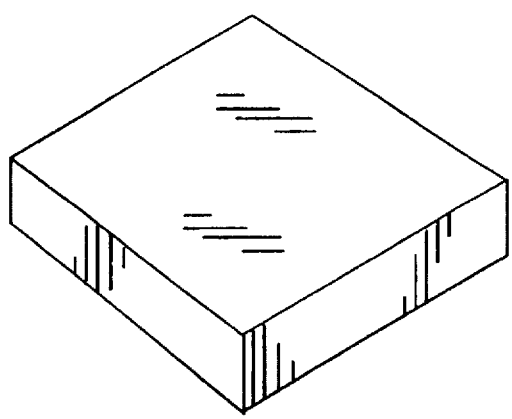
FIG. 11 pictorially represents a piezoelectric ceramic layer at various stages of fabrication.
Figure 11B:
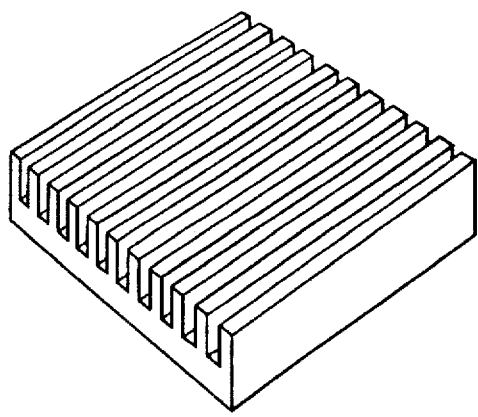
Figure 11C:
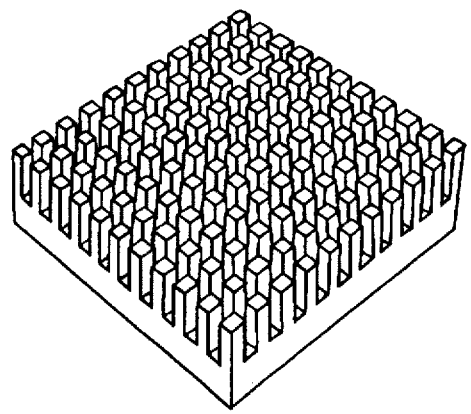
Figure 11D:
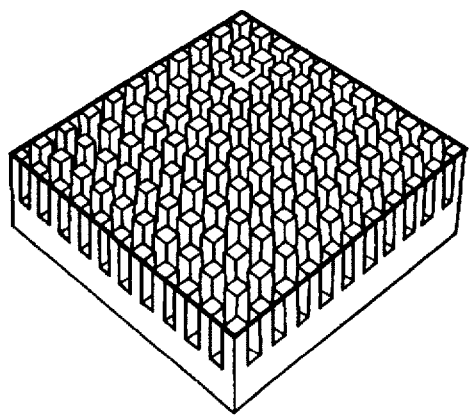
Figure 11E:
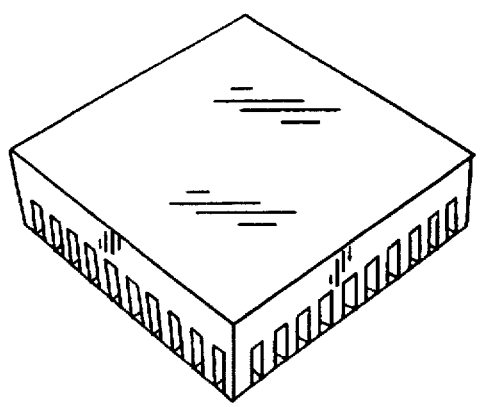
Figure 11F:
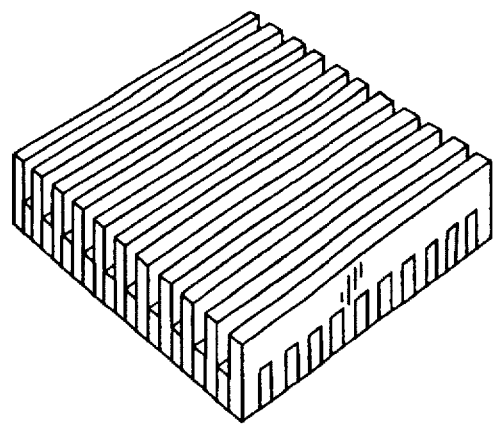
Figure 11G:
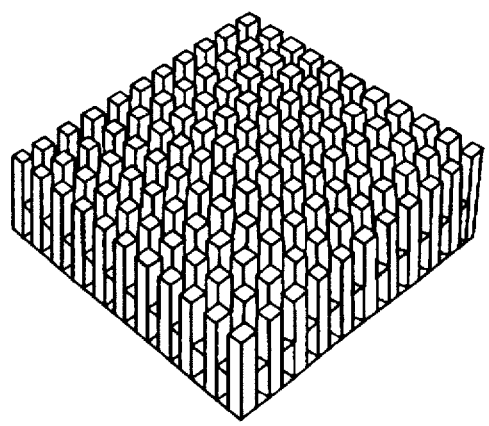
Figure 11H:
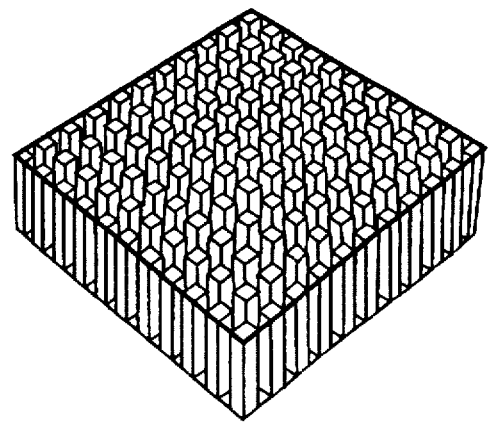

FIG. 8 shows a block diagram of a phased array medical ultrasonic scanner 140. The scanner includes transmitter circuitry 150, a transducer array 160 of the present invention, receiver amplifier circuitry 170, signal processing circuitry 180, such as envelope detection and filtering, a scan converter 190, and a television monitor 200. As shown in FIG. 8, the transducer assembly 145 may contain the transducer array 160, the transmitter circuitry 150, and the receiver/amplifier circuitry 170.

Other aspects of the present invention will now be described with reference to the two-dimensional multilayer transducer array described above. However, as will be appreciated by one of skill in this art, the advantages and benefits of the following embodiments are also applicable to linear and 1.5D arrays. Thus, linear arrays with reduced acoustic impedance and suppressed lateral mode may be made through the use of multilayer elements of piezoelectric composite materials. As will be appreciated by those of skill in this art, greatly simplified manufacturing techniques and transducer array layouts may be used to produce, for example, linear transducer arrays of multi-layer piezoelectric composite materials while still obtaining the benefits and advantages of the present invention.

In one embodiment of the present invention, a two dimensional ultrasonic transducer array is comprised of a piezoelectric composite material. In the fabrication of two dimensional ultrasonic transducer arrays, the critical descriptor of piezoelectric composites is the so called connectivity which describes the self connection of each phase in 1, 2, or 3 dimensions. Previously, the best performance of a PZT/epoxy composite for medical ultrasound transducers uses a 1-3 connectivity, i.e., a regular array of PZT members aligned in the thickness dimension of the transducer (connectivity=1) surrounded by a matrix of epoxy (connectivity=3).

Currently, the limiting factor in fabrication is the minimum PZT member size which presently results in an array of members 0.025 mm in diameter so that even a small array element 0.2 mm×0.2 mm would allow as many as 5×5=25 members per element. For a piezoelectric ceramic component of PZT-5H with a relative dielectric constant of $\epsilon^s_{33}=1430$, one arrives at a dielectric constant of approximately 800 for a composite of 50% volume fraction of PZT combined with 50% epoxy. This low dielectric constant exacerbates the high electrical impedance problem of two dimensional array elements. Thus the number of layers required to achieve a low electrical impedance is increased for this example composite material by the ratio of 1430/800, relative to that of a PZT MLC. PZT/air composite may also be used. In this case, for PZT-5H, the relative dielectric constant of a 50% PZT/50% air composite is 715, and the number of layers required in an MLC 2-D array is increased by a factor of 2. For example, we have recently fabricated a 1.5D array transducer from MLC PZT-5H material including electrical vias as described above. The array included 3×43=129 elements and consisted of 3 layers each 0.22 mm for a total stack thickness 0.66 mm. If the array were fabricated from a 1-3 connectivity composite (50% volume fraction PZT/50% air), a 6 layer stack would be required with each layer thickness=0.11 mm. For 1.5D arrays, typical layer thicknesses are from about 0.01 mm to about 0.3 mm.

There are several alternate implementations to fabricate a multi-layer two dimensional array of the 1-3 connectivity composite material. However, it should be noted that in the firing and sintering processes for the MLC materials, temperatures approaching 2000° C. are often used to achieve a rigid structure. Thus all organic components are burned off leaving essentially a PZT/air composite.

FIG. 9 illustrates a cross-section of a single element in a two dimensional array composed of a 3 layer 1-3 connectivity piezocomposite of 50% PZT/50% air. The simplest method of producing such an MLC material, as shown in FIG. 9, is to make each layer an independent 1-3 connectivity composite by simply using a PZT particle 300 which is approximately the size of the green tape layer thickness while maintaining a 50% volume fraction of PZT. As seen in FIG. 9, the PZT particles 300 are placed between electrode layers 330, 340 with an air gap or organic filler 350 separating adjacent particles. Alternating electrodes are interconnected by a ground via 310 and a signal via 320 to produce the multilayer element as described above. While FIG. 9 illustrates the placement of the PZT particles 300 as a cross-section of the multiple layers, the PZT particles 300 may actually be distributed in a two-dimensional pattern for a given layer. After drilling the vias, electroding, laminating, firing and sintering, and poling, using conventional MLC fabrication techniques, each layer in the MLC stack exhibits the properties of the 1-3 connectivity PZT/air composite since each layer is independently electroded.

In a more labor intensive fabrication method, one can use a conventional dicing and filling technique to produce the PZT members in each green tape layer. Laser milling or jet machining may be used to form the members in the ceramic green tape before backfilling with epoxy. However, it should be noted that in both these methods, there is no alignment or connectivity of PZT particles or members between layers.

FIG. 10 illustrates the cross-section of a completed composite element of a two-dimensional transducer array. As seen in FIG. 10, the piezoelectric layer is comprised of a plurality of piezoelectric members 400 separated by a gap 350 which may be filled with air or an organic filler. Suitable fillers for the gap 350 include epoxies, poly methyl methacrylate in cellulose acetate, poly vinyl alcohol or the commercially available organic binder Cladan produced by Tam Ceramics, Inc. of Niagra Falls, N.Y. The piezoelectric member 400 may be a piezoelectric rod and may be rectangular, circular, elliptical or other suitable cross-sectional shape. As FIG. 10 further illustrates, the piezoelectric members 400, 410, 420 are aligned across the layers of the multilayer element. Furthermore, as described above, these piezoelectric members 400, 410, 420, may be arranged in a two-dimensional pattern. However, to allow for alignment of the piezoelectric members, the two-dimensional pattern of the members should be the same from layer to layer or misalignment may occur. The layers of piezoelectric members are separated by the signal electrodes 340 and the ground electrodes 330 as described above to form the multilayer transducer element.

Alignment or registration of the members of a 1-3 connectivity PZT composite between layers of the MLC can be achieved by using the dice and fill fabrication method on each individual layer of PZT ceramic. This process may be used on individual PZT plates or on PZT green tapes which have undergone a preliminary firing process to make the green tapes more rigid. Before lamination each PZT layer is diced by a diamond wheel, dicing saw, jet machining, or laser scribed and filled with epoxy or an organic material using the conventional techniques to obtain the post patterns shown in FIG. 10. In one technique, two sets of deep grooves are cut in a block of piezoceramic at right angles to each other. A polymer is then cast into these grooves and the solid ceramic base is ground off. After polishing the plate to final thickness, electrodes are applied to the faces and the ceramic is poled by applying a strong electric field, usually at slightly elevated temperatures. FIGS. 11(a) through 11(h) illustrate an alternative method of forming the piezoelectric members. As seen in FIG. 11, to create the piezoelectric posts for a particular layer, a ceramic plate of the desired thickness (FIG. 11(a)) may be diced with two sets of grooves perpendicular to each other (FIGS. 11(b) and 11(c)). These grooves only extend partially through the ceramic plate. A polymer is then vacuum cast into the grooves (FIG. 11(d)) with a lid (not shown) waxed onto the top of the ceramic to prevent any polymer from coating the tops of the pillars. The ceramic plate is then turned over (FIG. 11(e)) and the process repeated with the grooves on the opposite side of the ceramic plate being aligned with the first set of grooves (FIGS. 11 (f) and 11(g)). The second set of grooves are then vacuum cast with a polymer (FIG. 11(h)) and the capping plates (not shown) are removed.

After fabrication of the piezoelectric members for a given layer, electrodes are screen printed and fired and vias are drilled for each layer. The PZT posts of one layer are then aligned with those of the next layer using the same alignment techniques and registration holes normally used to align the vias of conventional multilayer ceramics. Finally, the stack is laminated to obtain the 1-3 connectivity PZT/air composite MLC stack with PZT posts aligned between layers.

It should be noted that there are also lower temperature processes to fabricate multi-layer ceramic connectors in the electronic industry using firing temperatures below 1000° C. Applying these processes, it will be possible to use an inert material including a perfluoroalkyl polymer such as Teflon® or Zonal sold by E. I. Dupont between the PZT posts which will not burn off during the firing, laminating, sintering steps. Organic binders may also be deposited in the gap by vacuum impregnation after heating These composites will exhibit higher dielectric constant than a PZT/air composite. In an alternate implementation, a sheet of polyimide substrate commonly used in microelectronic connectors is etched by conventional photolithographic methods or by conventional reactive ion etching in the desired pattern leaving a cavity in the polyimide for each PZT post. A fine grain slurry of PZT is used to fill the cavities with the polyimide. Vias and electrodes for a two dimensional array transducer are implemented as in conventional thin film technology for polyimide substrates, i.e., sputtering or vacuum deposition. The vias and PZT are aligned between multiple identical layers, the layers are laminated and cured leaving a 1-3 connectivity PZT/polyimide composite MLC.

In the above description, certain aspects of the present invention were described with respect to the use of PZT as a piezoelectric material. However, the present invention is not limited to the use of PZT but may also utilize other piezoelectric materials or ferroelectric materials. The above description also described certain aspects of the present invention with respect to 1-3 connectivity material. However, the present invention may also utilize or produce other connectivity materials such as 2-2 or 0-3 connectivity.

Another aspect of the present invention combines the fabrication advantages of multi-layer ceramic connection (MLC) technology with the acoustic advantages of a low impedance conductive mismatching layer inserted between the piezoelectric element and the high acoustic impedance substrate of the MLC connector. The multi-layer ceramic connector consists of many thick films of ceramic (e.g., alumina) and metallization with customized interconnections between the layers called "vias".

Figure 12:
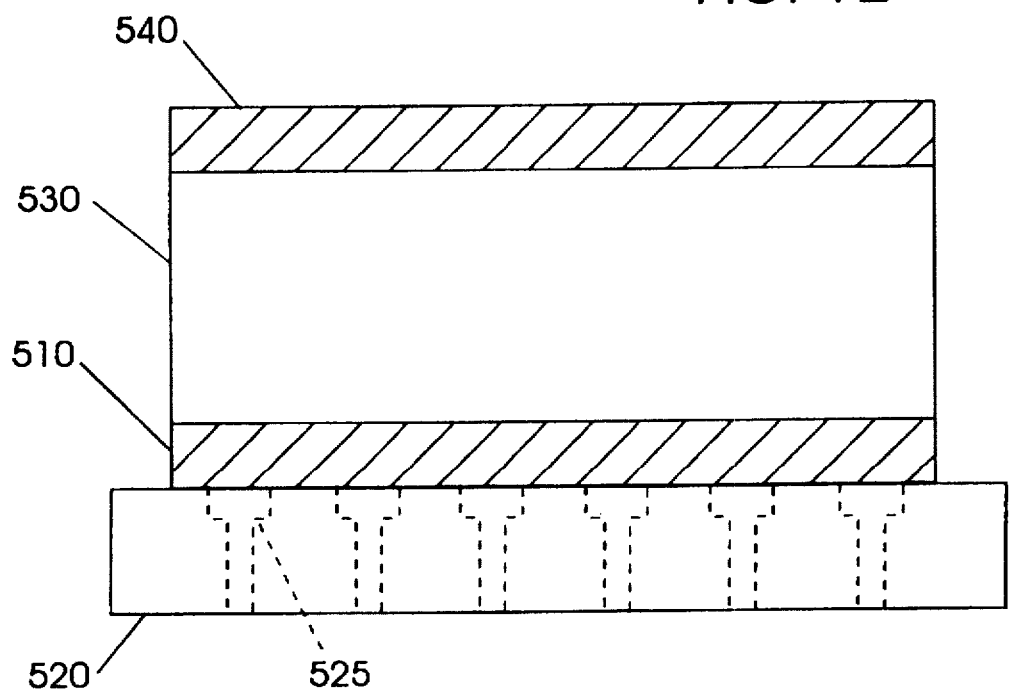
FIG. 12 is a cross sectional view of one embodiment of the present invention prior to the formation of the array of transducer elements.

FIG. 12 illustrates one embodiment of the present invention prior to the formation of the array of transducer elements. As seen in FIG. 12, a layer of electrically conductive material 510 is connected to the upper surface of a ceramic connector 520. The ceramic connector 520 includes connection pads 525 which provide an electrical connection from the upper surface of the ceramic connector to the lower surface of the connector. The ceramic connector 520 has one connection pad 525 for each transducer element.

A piezoelectric chip 530 is connected to the electrically conductive layer 510. Chips of known piezoelectric transducer materials of high acoustic impedance are suitable for use in the present invention, however lead zircanate titanate (PZT) is preferred. The lower surface of the piezoelectric chip 530 is connected to the upper surface of the electrically conductive layer 510, hereinafter referred to as the mismatching layer. The mismatching layer 510 provides an electrical connection between the piezoelectric chip 530 and the ceramic connector 520. The mismatching layer 510 also provides the mechanical connection between the piezoelectric chip 530 and the ceramic connector 520. The thickness of the layer 510 is preferably about one fourth the wavelength ($\lambda/4$) of the frequency of operation of the transducer and is referred to as the $\lambda/4$ mismatching layer. However, thicknesses of less than one quarter wavelength or multiples of one quarter wavelength may be used. The mismatching layer 510 is preferably made of silver epoxy or other conductive materials such as polymer or silicone anisotropic connector layers known as elastomeric connectors. The conductive epoxy $\lambda/4$ mismatching layer serves not only to bond the piezoelectric element to the pad of the ceramic connector but also to prevent acoustic transmission into the ceramic backing. As an example, for conductive epoxy $Z_1$=5M Rayls and for alumina MLC substrate $Z_2$=30M Rayls, a $\lambda/4$ conductive epoxy layer yields an effected backing impedance of $Z_1 = Z_1^2 / Z_2 = 0.8$M Rayls. Further alternatives for the composition of the mismatching layer 510 are low acoustic impedance, electrically conductive aerogel, carbon and conductive polyimide. These materials exhibit lower acoustic impedance and further reduce transmission to the ceramic substrate below the 2-D array. These materials also provide electrical connection between the piezoelectric element and MLC pad by mechanical compression or by use of thin layers of conductive epoxy. The mismatching layer may also be suitably doped with rubber particles or other scatterers such as glass or plastic microspheres to increase acoustic absorption in the mismatching layer.

As shown in FIG. 12, an optional second electrically conductive layer 540, which is referred to as the matching layer, may be connected to the upper surface of the piezoelectric chip 530. Like the mismatching layer, the thickness of the matching layer is preferably one fourth the wavelength ($\lambda/4$) of the frequency of operation of the transducer and is referred to as the $\lambda/4$ matching layer. The matching layer 540 may be made of the same materials as the mismatching layer 510. The use of a matching layer enhances transmission of the acoustic signal to and from the region under test.

Figure 13:
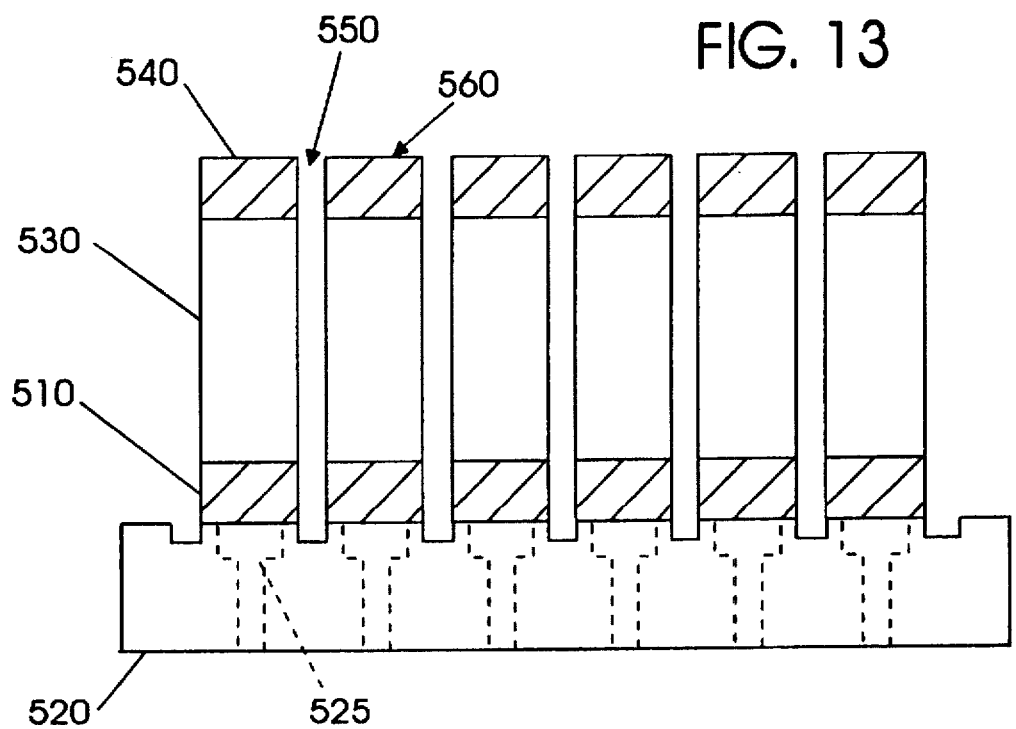
FIG. 13 is a cross sectional view of one embodiment of the present invention after the formation of the array of transducer elements.

As seen in FIG. 13, slots 550 are formed in the structure of FIG. 12 extending downward from the upper surface of the matching layer 540, if present, or the upper surface of the piezoelectric chip 530 if the matching layer 540 is not present. The slots 550 extend through the piezoelectric chip 530 and the mismatching layer 510 and into the ceramic connector 520. The slots 550 extend into the ceramic connector 520 to prevent inter-element acoustic cross talk in the ceramic connector. The slots 550 may be a groove or a plurality of grooves and may be filled with materials such as glass balloons or foam but are preferably void. The slots 550, provide separation means for dividing the matching layer 540, the piezoelectric chip 530, the mismatching layer 510 and the ceramic connector 20 into a plurality of transducer elements 560 which may be positioned in a two-dimensional (M×N) array or a linear (M×1) array. The transducer elements 560 are positioned such that electrical connection is selectively made to one of the connector pads 525 of the ceramic connector 520 thereby allowing for electrical connection to each of the transducer elements 560 to be used through the ceramic connector 525. As will be apparent to one of skill in the art, other means for dividing the piezoelectric chip into transducer elements may be utilized such as the division of the piezoelectric chip through selective placement of electrodes in contact with the piezoelectric chip thereby eliminating the need for slots to divide the piezoelectric chip.

Figure 14:
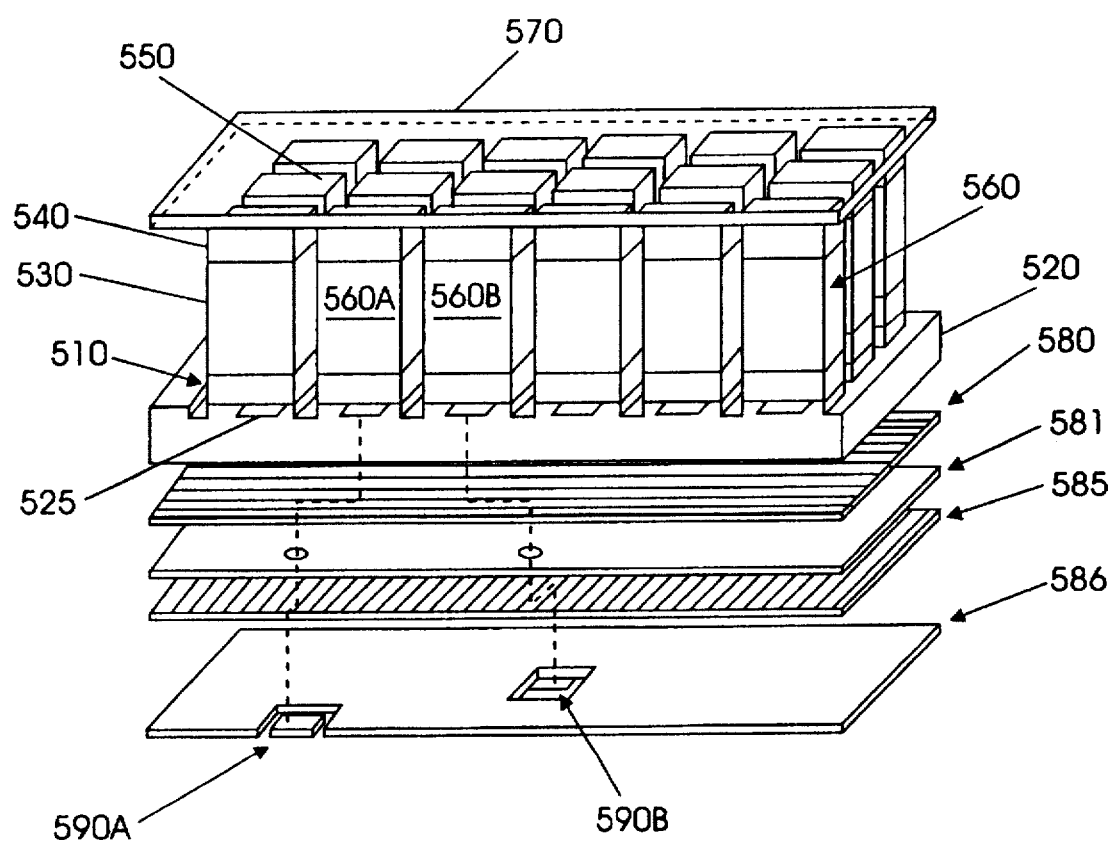
FIG. 14 is an orthogonal view of one embodiment of the present invention.

An orthogonal view of the present invention is shown in FIG. 14. As seen in FIG. 14, a conductive foil 570 such as gold coated mylar or silver foil is connected to the upper surface of the divided piezoelectric chip 530 or the matching layer 540 if present. The conductive foil 570 serves as the ground plane.

The structures of the present invention may be produced using any number of methods of bonding and dicing techniques. One such method is to deposit a thick film of conductive epoxy onto the piezoelectric chip utilizing standard thick film deposition techniques such as that employed by the Presco Model 462 Thick Film Screen Printer. The thickness of the conductive epoxy deposition is selected to produce the $\lambda/4$ mismatching layer 510 described above. The thickness of the conductive epoxy and piezoelectric chip may then be established by removing conductive epoxy until the desired dimension is achieved. Where thinner films of conductive epoxy are required a lapping wheel may be employed to reduce the thickness of the epoxy for precise adjustment of the thickness. Reactive plasma etching of all components may be employed to remove organic contaminants and oxidation and to leave a layer of surface ions to enhance bonding. In an alternate technique for very high frequencies, the piezoelectric chip and mismatching layer may then be deposited on the ceramic connector utilizing vacuum deposition, spin deposition, so-gel or other thin film deposition techniques. The piezoelectric chip 530 is then mounted to the ceramic connector 520 using more conductive epoxy to bond the chip 530 to the connector 520. A second optional conductive epoxy film is then deposited onto the piezoelectric chip 530 to produce the $\lambda/4$ matching layer 540. This structure is then diced to produce the slots which divide the structure into a plurality of transducer elements. The conductive foil 570 is then bonded to the piezoelectric chip 530 or the conductive epoxy of the matching layer 540 as a bonding agent.

Optionally, and as shown in FIG. 14, the two-dimensional array ultrasonic transducer of the present invention may have means for redistributing the electrical connections of the connection pads 525 of the ceramic connector 520 so as to increase the distance between electrical connections to a greater distance than that between individual connector pads 525. This increase in spacing between electrical connections allows for simpler connection to external electronics such as voltage sources and input amplifiers. The increased spacing allows for the use of coaxial connections between the transducer array and the external electronics which results in reduced noise in the electrical output from the transducer and thereby increases the usable sensitivity of the transducer array. The increased spacing is accomplished through the use of multi-layer ceramic technology. Beneath each connection pad 525 on the ceramic connector 525, a metallized via descends vertically to the first and second redistribution layers, 580 and 585 respectively, in order to expand the distance between transducer array elements to the desired distances between the connector output pads 590. As illustrated in FIG. 14, transducer elements 560A and 560B are separated by 0.2 mm. A via, 0.1 mm in diameter, descends from transducer element 560A to the first redistribution layer 580 where a printed conductor takes a path in a first direction, (for example left) to a second via which descends through a conductive layer 581, which acts as a ground plane, to the second redistribution plane where a conductor moves in a second direction transverse to the first direction (for example forward as shown in FIG. 14) to a third via which descends through a second conductive layer 586, which also acts as a ground plane, to the output pad 590A. Meanwhile, beneath transducer element 560B, a via descends to the first redistribution layer 580, moves in a first direction to a new via which descends through conductive layer 581 to the second redistribution layer 585 to move in a second direction transverse to the first direction to a new via which descends through conductive layer 586 to the output pad 590B. This design is repeated for each of the transducer array elements and can be used to expand for example, the 0.2 mm interelement spacing to a 0.5 mm spacing typical of output pad for conventional connection to coaxial cables. For complex 2-D transducer array patterns, it is necessary to use several redistribution layers to avoid crossing conductors. To reduce electrical cross-talk between the vias, ground planes are included between each redistribution layer.

Fabrication of the redistribution and ceramic connector may be accomplished as follows using procedures known to one of skill in the art. A mixture of an organic binder and ceramic powder (e.g. alumina) is spread to form a thin layer and heated to form what is known as "green tape". Multiple holes are punched (mechanically or by laser) or etched into the tape to form the vias. The via holes are filled with a metal paste (e.g. silver) and metallic traces are laid down by screen printing on the first and second redistribution layers. Multiple layers of green tape are then superimposed to align the vias, the multi-layer sandwich is laminated and then finally sintered to form a single package. Silver is then plated or vacuum deposited on the input pads and gold pins are brazed on the output contacts.

Uses for the present invention include three dimensional ultrasound imaging or volumetric measurements and thin slice ultrasound imaging. In use, the transducer elements of the two-dimensional array ultrasonic transducer are excited by a voltage source in electrical connection with the transducer elements through the ceramic connector. The electrical voltage source places an electrical voltage across the element to produce an ultrasonic output from the element. These voltages typically range from about 50 volts to about 300 volts. The voltage excites the transducer element to produce an ultrasonic signal which is transmitted from the transducer array into a test region. When receiving ultrasonic signals, the ultrasonic signal excites a transducer element to produce an electrical voltage across the transducer element. This electrical voltage is the amplified by an amplifier in electrical connection with the transducer element through the ceramic connector. A further advantage of the present invention is the ability to use what is known in the art as "cavity down" positioning of integrated circuit with the multi-layer ceramic connector to provide amplifiers for receive and transmit mode use of the transducers in a single integrated package. Using the "cavity down" method, an integrated circuit is mounted directly onto the connection side of the multi-layer ceramic connector thereby incorporating the integrated circuit as part of the transducer array assembly and allowing for the integration of the circuitry into the handle of the transducer array to provide a more compact unit.

The present invention may be used over a wide range of operating frequencies of from about 1 MHz to about 10 MHz and above. Variations in the physical thickness of the mismatching and matching layers will be required based on the desired operating frequency of the device with the thickness being proportional to the wavelength of the operating frequency as described above. The physical dimensions and number of elements in the two-dimensional array will depend upon the application of the transducer array. For example, a square array of square transducer elements can be utilized for three dimensional imaging systems. Square transducer elements of from about 0.1 mm to about 1 mm are suitable for three dimensional imaging using frequencies of from about 10 MHz to about 1 MHz. However, as smaller dimensions are utilized, operating frequencies of greater than 10 MHz may be achieved. The depth of the slots described above determines the height of the piezoelectric chip and other layers and is typically from about 0.1 mm to about 1 mm.

For applications of thin slice imaging, a rectangular array of rectangular transducer elements is advantageous. For example, a 4×32 element array of rectangular transducer elements may be used. Rectangular elements having a width of from about 0.1 mm to about 1 mm and a length of from about 2 mm to about 20 mm is preferred. As described herein, the width of the transducer elements is that dimension of the elements parallel to the axis of the array having the larger number of transducer elements and the length is that dimension of the transducer elements which is parallel to the dimension of the transducer array having the smaller number of elements.

Figure 15:
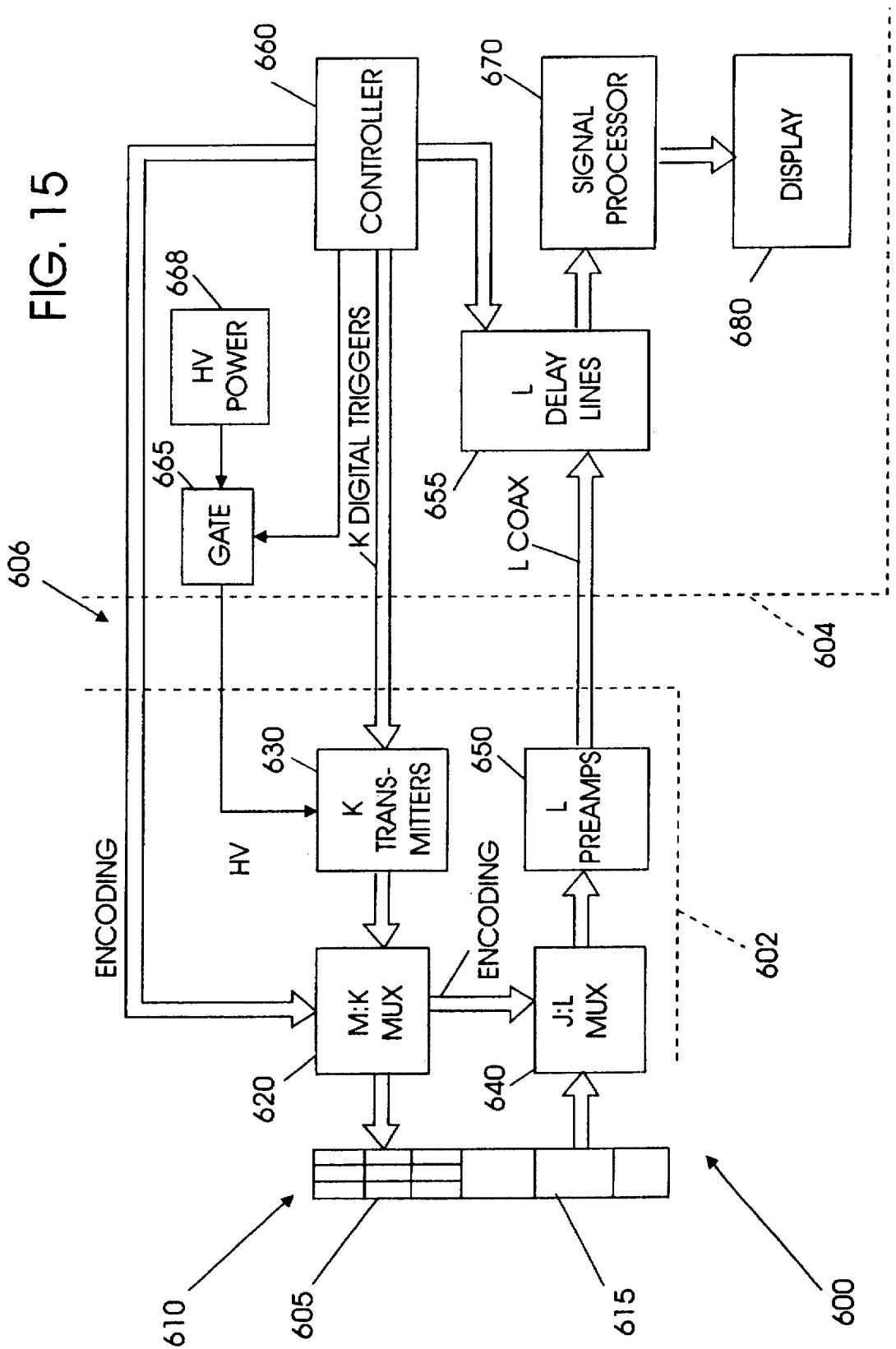
FIG. 15 is a block diagram of an ultrasonic scanner architecture according to a first embodiment of the present invention.

By improving the efficiency and increasing the emitted ultrasound power from the transducer array using the techniques described above, lower voltage transmit and receive circuitry may be utilized. The electrical impedance of the transmit piezoelectric elements may be reduced through the use of the above described multi-layer piezoelectric structure. In this case, it will be possible to use integrated circuit low voltage transmitters totally contained in the transducer handle. FIG. 15 illustrates one embodiment of the scanner architecture obtainable when using low voltage transmitters and/or transmitter/multiplexers combined with receiver preamplifier/multiplexers incorporated in the transducer handle. In this case, the total number of coaxial cables is reduced to L+K. In addition, a few digital lines or a few bits of serial code would be necessary to encode the transmit and receive switching circuitry such as multiplexers (e.g., 8:1 MUX require 3 bit coding resulting in 3 more wires or 3 serial bits), and a few power supply cables would be necessary. Note the high voltage power supply (HV) could be gated on only during the transmit timing for improved electrical safety.

As seen in FIG. 15, the ultrasonic scanner 600 consists of a transducer assembly 602 and a scanner rack 604. The transducer assembly 602 incorporates an N element transducer array 610 which is comprised of a plurality of multilayer transducer elements 605 and a plurality of single layer transducer elements 615. As used herein, multilayer transducer elements refers to the transducer elements described above which include electrode layers interspersed with layers of piezoelectric material or other appropriate materials for producing ultrasonic pulses. Thus, the transducer array 610 is divided into a transmit set of multilayer elements 605 and a receive set of single layer elements 615. In operation the scanner 600 utilizes the controller 660 in the scanner rack 604 to generate digital triggers which are transmitted to the transmit amplifiers 630 in the transducer assembly 602 through the cabling 606. The controller also controls the gate 665 for the high voltage power supply 668 and gates on the high voltage power supply at the appropriate time in relation to the trigger signals sent to the transmit amplifiers 630. The transmit amplifiers 630 then generate the high voltage waveform or pulse which is sent through the transmit multiplexer 620 to the selected transmit element or elements 605. The transmit switchin circuitry illustrated by the multiplexer 620 located in the transducer assembly 602 then select the appropriate transmit element by receiving the encoded selection signal from the controller 660 in the scanner rack 604 through the cabling 606. The selected transmit element then generates the ultrasonic pulse corresponding to the electric pulse received by the element.

The scanner 600 receives ultrasonic pulses incident upon the receive elements 615 which are converted to an electrical signal corresponding to the ultrasonic pulse. This electrical signal is received by the receive switching circuitry illustrated by the multiplexer 640 in the transducer assembly 602 and the appropriate signal is selected responsive to the encoded selection signal received from the controller 660 in the scanner rack 604 through the cabling 606. The selected receive signal is the provided to the receive preamplifiers 650 in the transducer assembly 602 for amplification and transmission through the cabling 606 to the delay lines 655 in the scanner rack 604. Once received by the delay lines 655 the operation of the scanner 660 is as a traditional ultrasonic scanner where the receive signal is processed by the signal processor 670 and displayed on the display 680.

Figure 16:
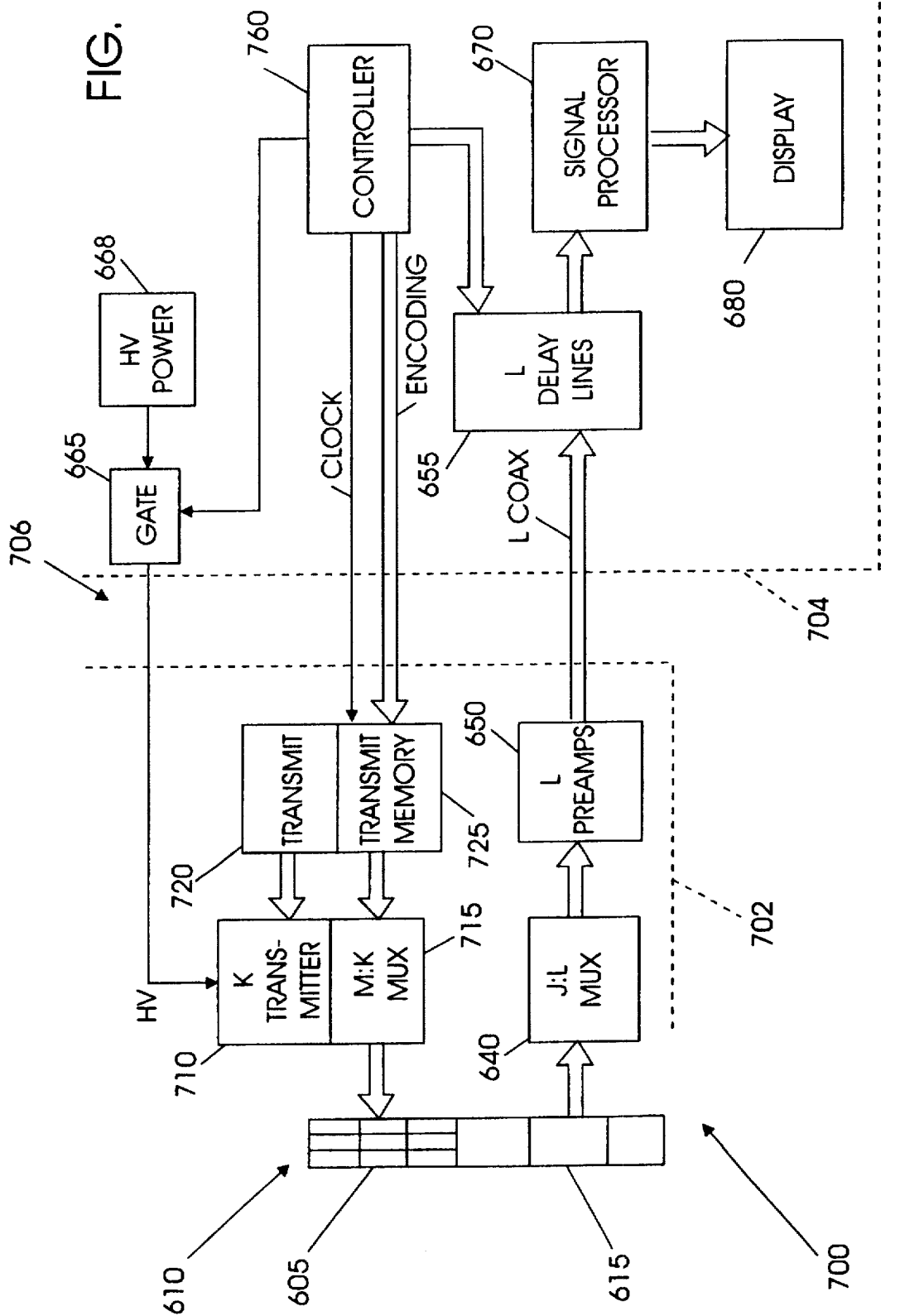
FIG. 16 is a block diagram of an ultrasonic scanner architecture according to an alternate embodiment of the present invention.

An alternative embodiment is illustrated in FIG. 16 and includes the complete transmit digital logic of a phased array scanner in the transducer assembly. In this case, for M multilayer piezoelectric transmit elements 605 and J single layer receive elements 615 in the N element array transducer 610, the transmit integrated circuits in the transducer assembly 702 includes K low voltage (e.g. 15 volt) transmitters 710, M:K transmit switchin circuits illustrated by multiplexers 715, digital memory 725 containing transmit select data to encode the transmit multiplexers, i.e., to choose the connections between transmitters and transducer elements and transmit timing data, i.e., delay data which are loaded into transmit down counters in the trigger circuitry 720 to trigger K and transmit pulse shape and amplitude apodization.

This alternative embodiment requires only L receive coaxial cables, digital control wires to select the desired transmit elements, pulse shapes, amplitude, and timing, and the clock wire to increment the memory address, and the power supply cables. Alternatively, the transmit multiplexers 715 in FIG. 16 may be eliminated. Since the required element transmit voltage (~15 V) is similar to that of the power, control, and output voltages of conventional digital logic, it is possible to utilize a single multiple-channel pulse sequence generator chip to drive the transmit elements. Memory within this chip could store transmit pulse shapes, timing data, and element selections. A single output pin of this chip would be dedicated to each transmit element, eliminating the need for multiplexing.

In operation, the scanner 700 of FIG. 16 operates in much the same manner as the scanner 600 of FIG. 15. The scanner 700 is comprised of a transducer assembly 702 and a scanner rack 704 which is connected to the transducer assembly 702 by the cabling 706. The controller 760 in the scanner rack 704 provides encoding and clock information through the cabling 706 to the digital memory 725 and the trigger circuitry 720 located in the transducer assembly 702. The digital memory 725 and the trigger circuitry 720 utilize this information in the selection of the elements to produce ultrasonic pulses and to synchronize the transmission of ultrasonic pulses with the receive circuitry of the scanner 700. As with the scanner 600 the scanner 700 also uses the controller 760 to control the gate 665 for the high voltage power supply 668 to provide the high voltage to the transducer assembly 702 through the cabling 706. The digital memory 725 and the trigger circuitry 720 generates the control signals for the transmit multiplexer 715 and the transmit amplifiers 710 to produce the appropriate electrical pulse to the selected transducer element of the transmit set of transducer elements which in turn produces the desired ultrasonic pulse. The receive operation of the scanner 700 operates in the same manner as that of scanner 600 described above.

Figure 17:
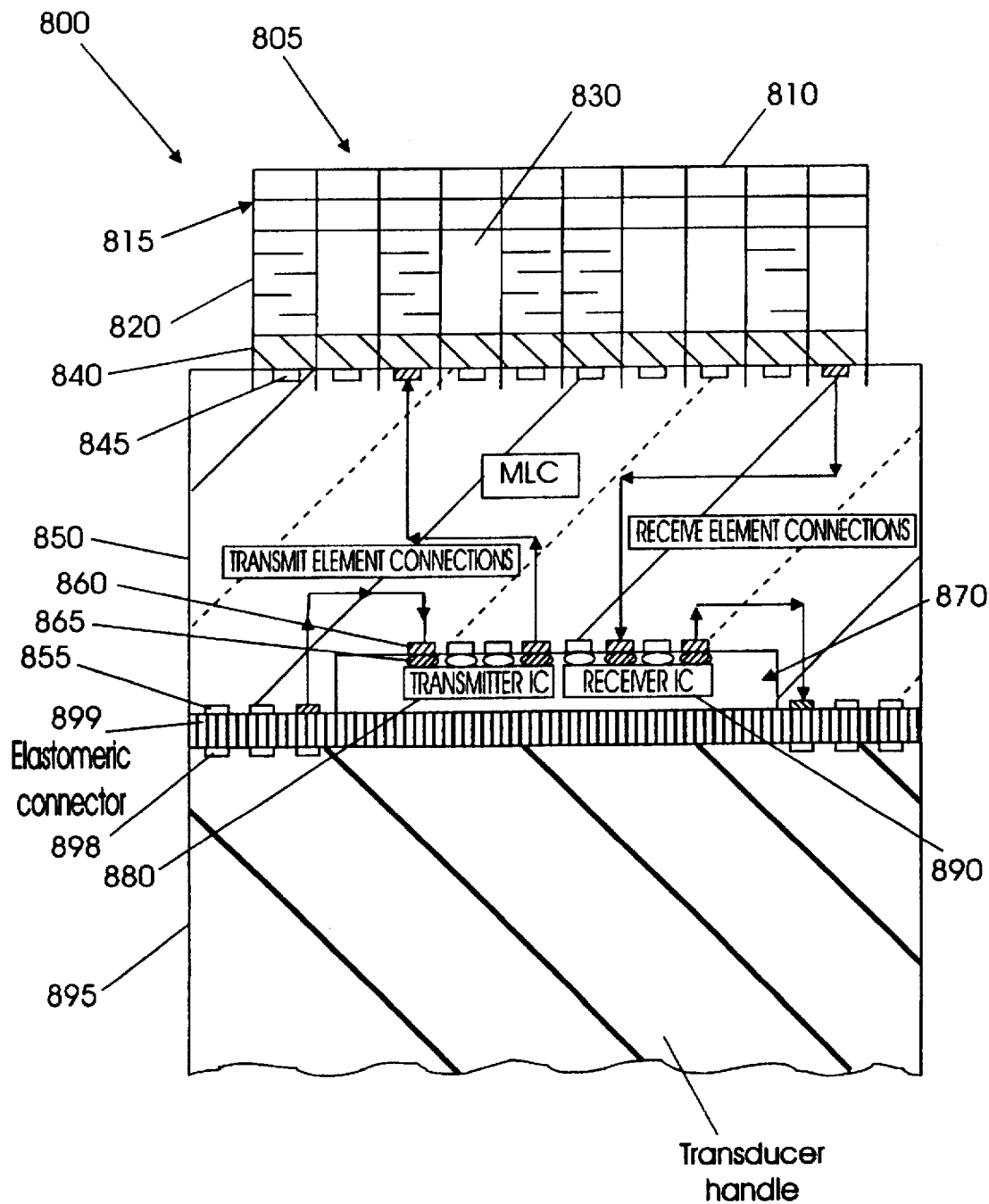
FIG. 17 is a cross-sectional view of a transducer assembly according to the present invention.

One embodiment of the present invention, which is consistent with the architecture of FIGS. 15 and 16, is illustrated in FIG. 17. FIG. 17 shows a cross sectional view of a transducer assembly 800 having an array transducer 805 (linear, curvilinear or 2-D array) constructed as described above and consisting of a ground plane silver foil 810, single or double quarter wave acoustic matching layer(s) 815, multilayer piezoelectric material 820 with interlaminar vias for transmit elements, single layer receive elements 830, quarter wave mis-matching layer 840, and multilayer ceramic connection (MLC) with fan out 850 which may optionally act as a standoff for the transducer array 805. The multilayer piezoelectric material can include lead zirconate titanate (PZT), PZT-epoxy composites, polyvinylidene fluoride (PVDF), or relaxor ferroelectrics such as lead magnesium niobate (PMN). The transmit and receive elements may be distributed anywhere throughout the array transducer aperture in any desired pattern. They are shown in the particular groupings of the present figures for illustrative purpose only. The input/output signals of the integrated circuits 880, 890 arrive at pads 860 positioned on the top surface of a cavity 870 or recess ("cavity down") in the bottom of the MLC 850. The transmit 880 and receive 890 integrated circuit bare dies are mounted in the cavity 870 connected to these pads by means of the connection technology known as solder bumps 865 or C4 developed by International Business Machines Corporation, White Plains, N.Y.

FIG. 17 also shows connector pads 855 (e.g., gold plated) positioned on the periphery of the bottom surface of the MLC connector 850 forming a pad grid array for connection through an elastomeric connector 899 to the pads 898 of the corresponding pad grid array of the transducer handle 895. The input signals to the transmit integrated circuit(s) 880 are connected to these pads. The signals proceed through the MLC connector by plated traces and vias to the inputs of the solder bumps 865 and pads 898 of the transmitter/multiplexer circuits 880. The output signals from the transmit circuits 880 are connected by pads, solder bumps, traces, vias and pads 845 to the multilayer PZT transmit elements 820 in the transducer array 805 which emit the desired ultrasound pulses. The receive echoes return to the single layer PZT receive elements 830 in the transducer array 805 whose signals proceed to the receive mode integrated circuits 890 using the traces, interlaminar vias and solder bumps. In analogous fashion, the output signals from the receive IC's 890 are connected to the output pads 855 of the MLC 850 which are connected to the pads 898 of the pad grid array in the handle 895 and then to the scanner electronics. Screen printed inductors and capacitors for electrical matching circuits to the transmit or receive elements can be included in the MLC connector 850.

Figure 18A:
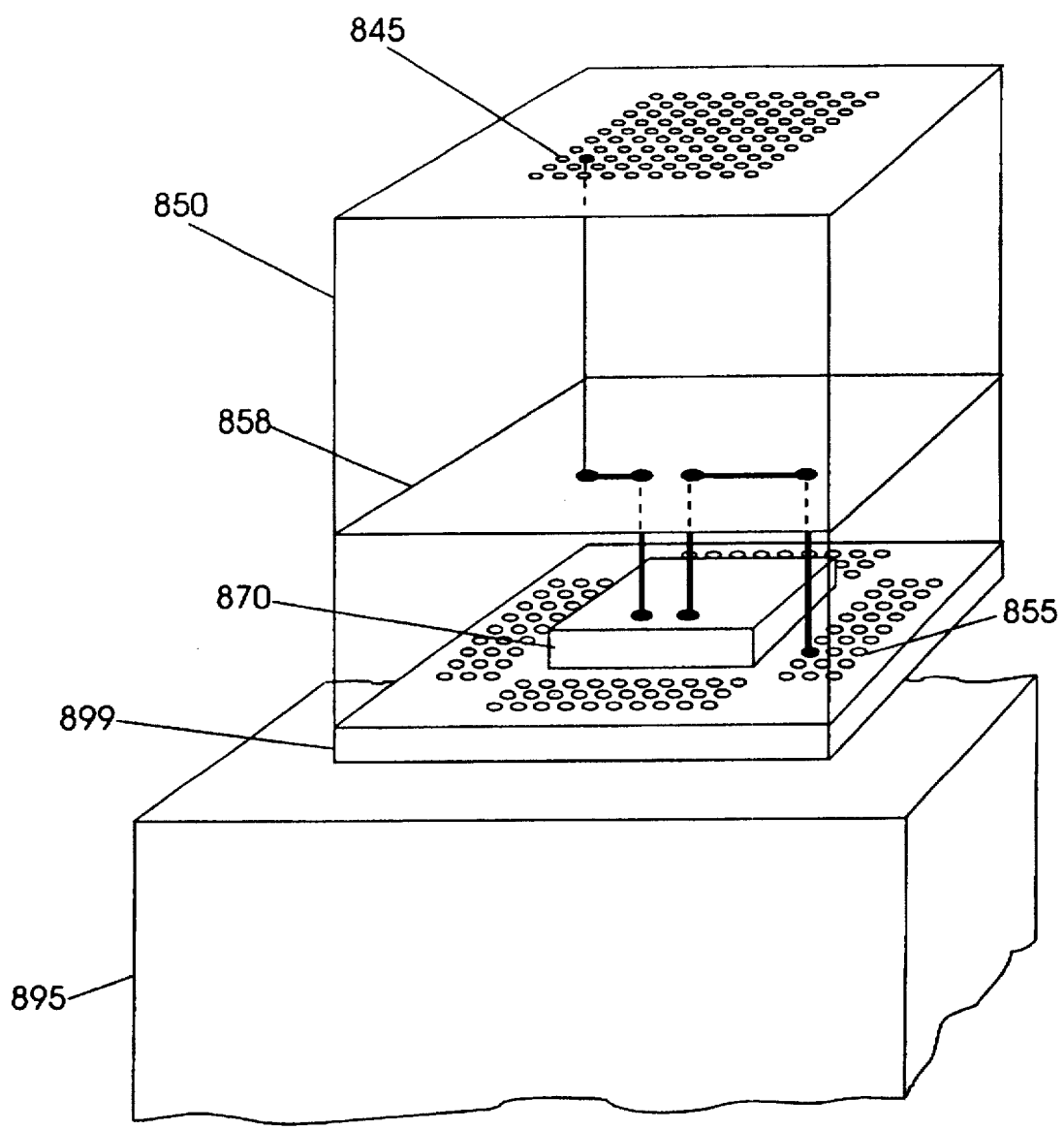
FIG. 18A is a top view perspective of the transducer assembly of FIG. 17.
Figure 18B:
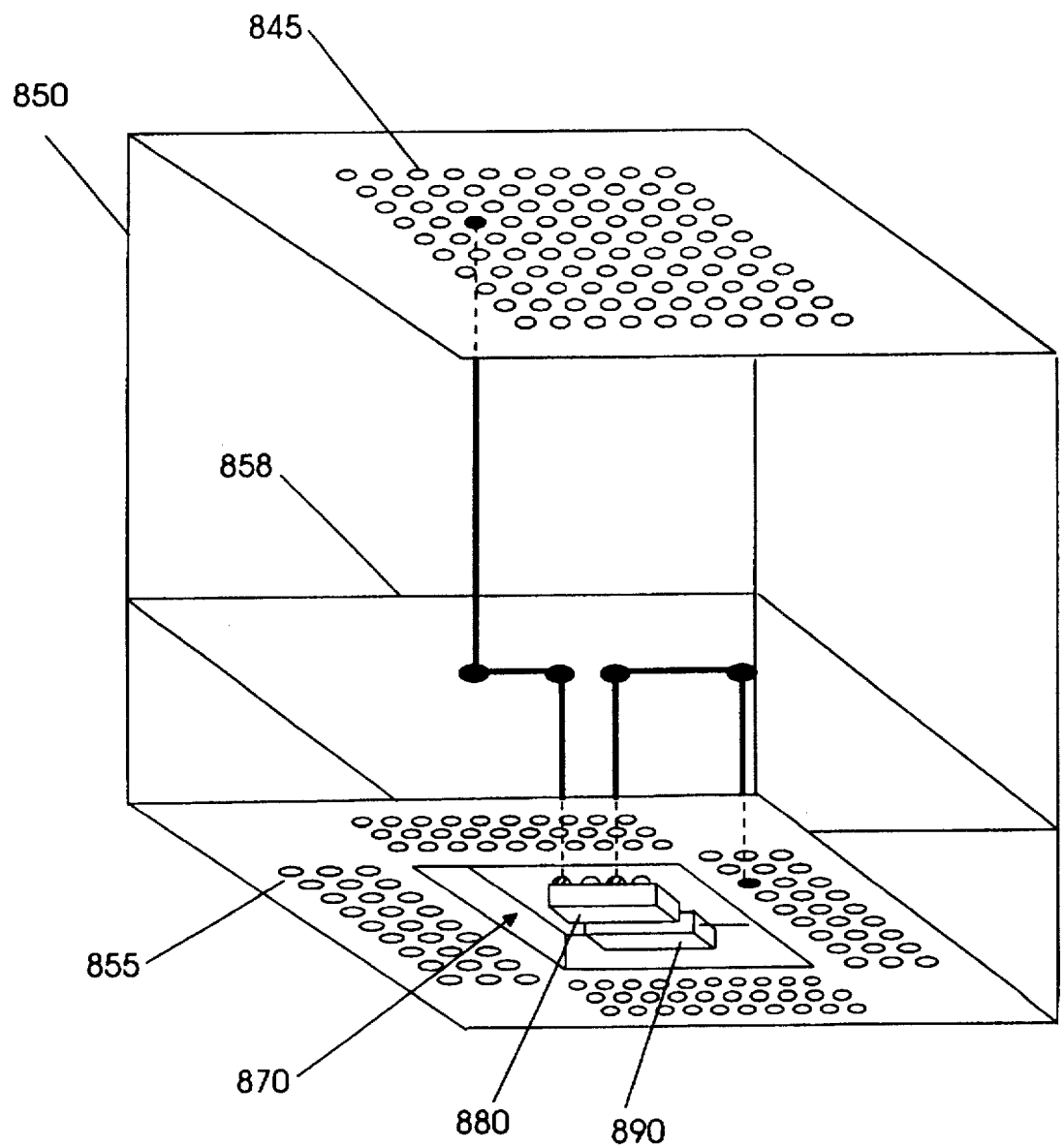
FIG. 18B is a bottom view perspective of the transducer assembly of FIG. 17.
Figure 19:
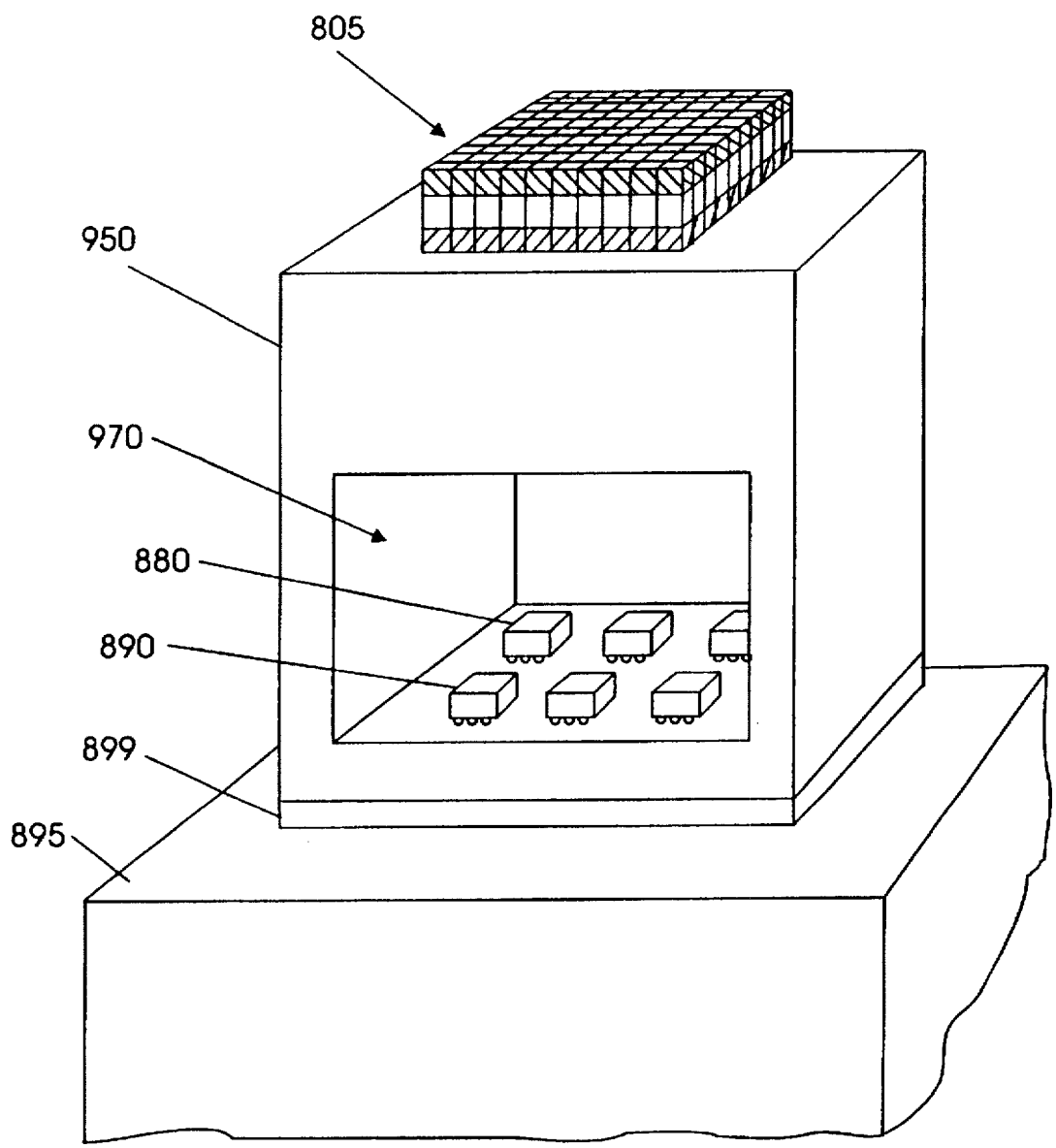
FIG. 19 is a perspective view of an embodiment of the transducer assembly of the present invention having an internal cavity.

A perspective view of the MLC connector, including the standoff portion and redistribution layers 858, as seen from above is shown in FIG. 18A. A perspective view of the MLC connector as seen from below is shown in FIG. 18B including illustrative integrated circuit dies. The IC dies are shown in the flip-chip position using solder bump connections. Alternatively the IC's could be mounted with their connector pads pointed down in FIG. 18B to enable conventional wire bonding connections to the pads of the MLC connector. Another alternate implementation of the invention is shown in the perspective drawing of FIG. 19 which includes the integrated circuit dies 880, 890 mounted in an internal cavity 970 of the MLC connector 950. The transducer array 805 is mounted on the upper surface of the MLC connector 950 which is connected to a handle 895 through the elastomeric connector 899. The IC's are again shown in the so-called flip-chip position with input/output pads down for connection using solder bump techniques.

Figure 20:
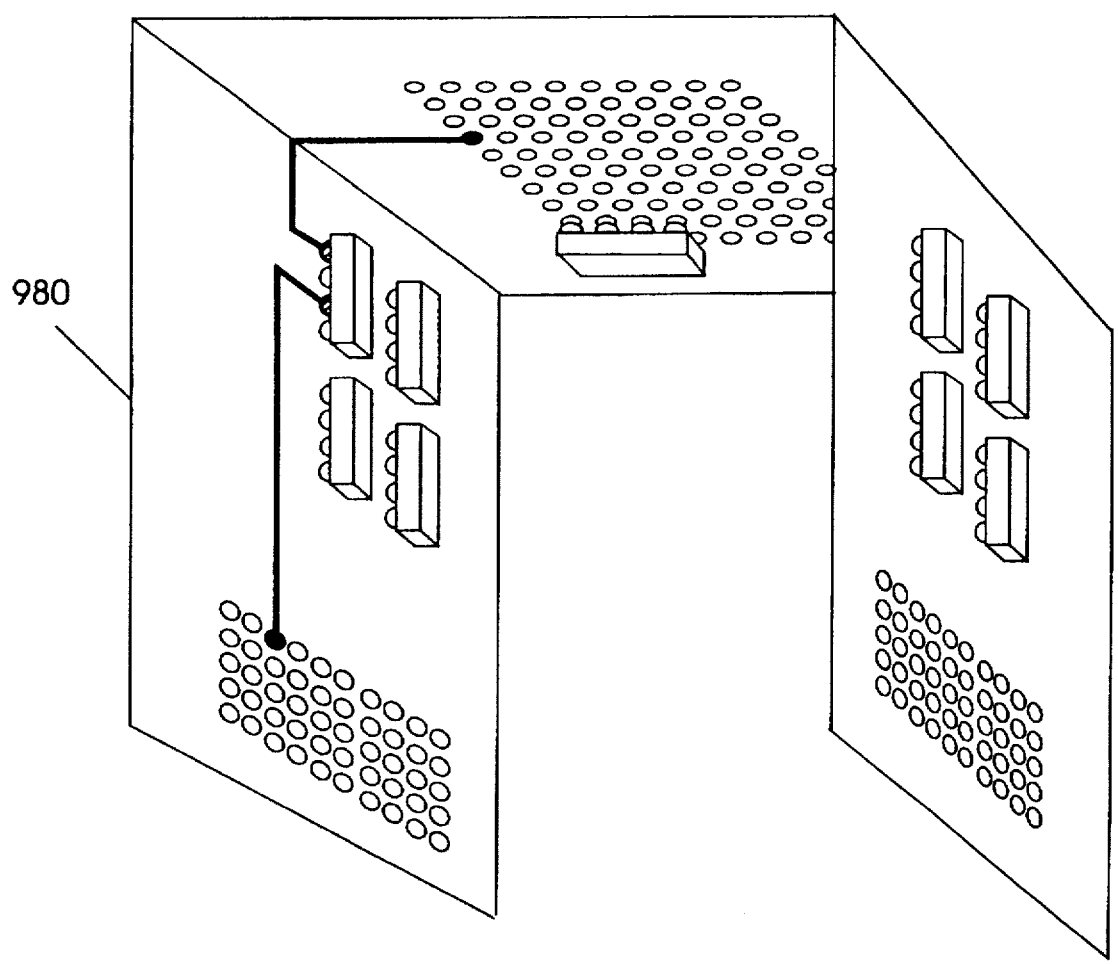
FIG. 20 is a perspective view of an embodiment of the present invention employing polymer flex circuit material.

FIG. 20 shows an alternate implementation of the connection technology using a polymer circuit material (single layer or multi-layer) which may be flexible such as polyimide which is bonded to the piezoelectric elements of the transducers array. Polymer flex circuit such as Dupont Kapton may be used. The transmit/receive IC dies are shown mounted to the inside, underside, or outside of the flex circuit 980. Photolithographically etched or laser ablated metallic traces are used to produce the fan-out connection from the transducer array elements to the integrated circuits. The interior volume enclosed by the polymer flex circuit 980 can be filled with a polymer foam or epoxy to provide mechanical stability to the transducer assembly and to provide a low acoustic impedance backing for the transducer. The polymer flex circuit 980 does not act as a quarter wave acoustic mis-matching layer but is fabricated sufficiently thin so as to approximate a membrane. e.g. 1/10 wavelengths or less so as not to interfere with the propagation of acoustic waves into the backing.

In another alternate implementation the transmit/receive integrated circuits can be fabricated on a monolithic silicon wafer. A polyimide connector can be spun onto the silicon surface, metalized and photolithographically etched to connect to the transducer array and to obtain the electrical connection fan out. In this case, the polyimide can be fabricated in multilayers to obtain a thickness to act as an acoustic mismatching layer e.g. $\lambda/8$ to $\lambda/4$ between the high acoustic impedance PZT and the high acoustic impedance silicon. In another alternate implementation, the transmit/receive integrated circuits might not be integrally incorporated into the MLC or polyimide connector but may be packaged in surface mount electronic packages and mounted on miniature circuit boards in the transducer handle. In another implementation, multilayer piezoelectric material might be used for both transmit and receive elements in which case the receive mode preamplifiers are less significant in improving sensitivity.

The performance of prior transducers compared to the current invention is illustrated in the following example. Consider a 5×102=510 element, 2-D array transducer fabricated from PZT-5H to be used for ultrasound B-scanning at 2.5 MHz. Typical dimensions of each element in such a transducer array would be a thickness of 0.7 mm, width of 0.35 mm, and length of 2 mm. The magnitude of the electrical impedance of such a single layer element is approximately 4.7 k$\Omega$ near its frequency of resonant operation, approximately 2 MHz, for a low acoustic impedance backing. For such an array transducer with so many elements, it will be very difficult to incorporate discrete matching components such as transformers or inductors into the transducer handle. Therefore, as a point of comparison, one can assume 50 $\Omega$ transmit circuits in the scanner rack connected by 510 coaxial cables 2 meters long (50 $\Omega$ characteristic impedance, capacitance, 21 pf/m) to the transducer elements which include double acoustic impedance matching layers. The received ultrasound echoes return along the coaxial cables to preamplifiers (50 k$\Omega$ input impedance). Using a standard equivalent circuit model known as the KLM mode, one can calculate a figure of merit for electrical sensitivity known as pulse-echo insertion loss which yields a value of 51 dB of loss for this transducer, i.e. for a transmit drive voltage of 100 volts the pulse-echo output signal at the output signal at the input to the preamplifier is 51 dB below 100 volts.

For the case of the current invention in the transmit mode, one could use a 21 layer PZT element, each layer thickness= 0.03 mm which yields an electrical impedance of approximately 15 $\Omega$ near its resonant frequency. One would use single layer transducer elements in receive mode connected to the preamplifiers in the handle. For equivalent backing materials, and double acoustic matching layers, one obtains a predicted pulse echo insertion loss of only 11 dB. This is an improvement of 39 dB over the control case so that a 1 volt transmit signal for the current invention will yield approximately the same pulse-echo sensitivity as a 100 volt transmit signal for the control transducer.

The foregoing is illustrative of the present invention and is not to be construed as limiting thereof. For example, other methods of fabrication of the present invention may be utilized while still benefitting from the teachings of the present invention. Those skilled in this art will also appreciate that other methods of increasing the distance between electrical connections to the transducer elements of the present invention may be utilized. The invention is accordingly defined by the following claims, with equivalents of the claims to be included thereof.

That which is claimed is:

1. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements, said plurality of transducer elements being comprised of a set of low impedance multilayer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element, wherein said low voltage transmitter transmits voltages of about 15 V or less to said transmit elements; and receive circuitry means integral with said transducer assembly and operably associated with said receive set of transducer elements for selecting an electrical signal corresponding to an ultrasonic signal from a target received by a selected one of said receive set of transducer elements.

2. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements, said plurality of transducer elements being comprised of a set of low impedance multilayer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector, and wherein a plurality of said low impedance transmit elements comprise at least 5 layers to reduce the associated electrical impedance;

a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element; and receive circuitry means integral with said transducer assembly and operably associated with said receive set of transducer elements for selecting an electrical signal corresponding to an ultrasonic signal from a target received by a selected one of said receive set of transducer elements.

3. An ultrasonic transducer assembly according to claim 2 wherein said transducer assembly is a linear array transducer assembly and a plurality of said multi-layer transmit elements have an electrical impedance of about 12 Ohms or less at operating frequency.

4. An ultrasonic transducer assembly according to claim 2 wherein said transducer assembly is a 1.5D array transducer assembly and a plurality of said multi-layer transmit elements have an electrical impedance of about 40 Ohms or less at operating frequency.

5. An ultrasonic transducer assembly according to claim 2 wherein said transducer assembly is a 2D array transducer assembly and a plurality of said multi-layer transmit elements have an electrical impedance of about 200 Ohms or less at operating frequency.

6. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements to form an array of transducer elements, said array of transducer elements being comprised of a set of multilayer transmit transducer elements and a set of single layer receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

a transmitter integral with said transducer assembly for selectively providing a low voltage electrical signal to said transmit transducer elements to generate an ultrasonic pulse, wherein said transmitter transmits imaging pulse voltages of about 15 V or less to said transmit elements;

processing means integral with said transducer assembly and operably associated with said transmitter for controlling said ultrasonic pulses;

receive switching means integral with said transducer assembly and operably associated with said receive set of transducer elements for selecting an electrical signal corresponding to an ultrasonic signal from a target received by a selected one of said receive set of transducer elements; and receive amplifier means integral with said transducer assembly and operably associated with said receive switching means for applying said selected electrical signal.

7. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements to form an array of transducer elements, said array of transducer elements being comprised of a set of multilayer transmit transducer elements and a set of single layer receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector, and wherein a plurality of said low impedance transmit elements comprise at least 5 layers to reduce the associated electrical impedance;

a transmitter integral with said transducer assembly for selectively providing a low voltage electrical signal to said transmit transducer elements to generate an ultrasonic pulse.

processing means integral with said transducer assembly and operably associated with said transmitter for controlling said ultrasonic pulses;

receive switching means integral with said transducer assembly and operably associated with said receive set of transducer elements for selecting an electrical signal corresponding to an ultrasonic signal from a target received by a selected one of said receive set of transducer elements; and receive amplifier means integral with said transducer assembly and operably associated with said receive switching means for applying said selected electrical signal.

8. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements to form an array of transducer elements, said array of transducer elements being comprised of a set of multilayer transmit transducer elements and a set of single layer receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

a transmitter integral with said transducer assembly for selectively providing a low voltage electrical signal to said transmit transducer elements to generate an ultrasonic pulse;

processing means integral with said transducer assembly and operably associated with said transmitter for controlling said ultrasonic pulses;

receive switching means integral with said transducer assembly and operably associated with said receive set of transducer elements for selecting an electrical signal corresponding to an ultrasonic signal from a target received by a selected one of said receive set of transducer elements; and receive amplifier means integral with said transducer assembly and operably associated with said receive switching means for applying said selected electrical signal, wherein said transducer assembly is a linear array transducer assembly and a plurality of said multilayer transmit elements have an electrical impedance of about 12 Ohms or less at operating frequency.

9. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements to form an array of transducer elements, said array of transducer elements being comprised of a set of multilayer transmit transducer elements and a set of single layer receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

a transmitter integral with said transducer assembly for selectively providing a low voltage electrical signal to said transmit transducer elements to generate an ultrasonic pulse;

processing means integral with said transducer assembly and operably associated with said transmitter for controlling said ultrasonic pulses;

receive switching means integral with said transducer assembly and operably associated with said receive set of transducer elements for selecting an electrical signal corresponding to an ultrasonic signal from a target received by a selected one of said receive set of transducer elements; and receive amplifier means integral with said transducer assembly and operably associated with said receive switching means for applying said selected electrical signal, wherein said transducer assembly is a 1.5D array transducer assembly and a plurality of said multilayer transmit elements have an electrical impedance of about 40 Ohms or less at operating frequency.

10. An ultrasonic transducer assembly comprising:

a connector having an upper surface, a lower surface and an array of connector pads formed in said connector for electrically connecting said upper surface to said lower surface;

an ultrasonic transducer chip mounted on said upper surface of said connector, said ultrasonic transducer chip being divided into a plurality of transducer elements to form an array of transducer elements, said array of transducer elements being comprised of a set of multilayer transmit transducer elements and a set of single layer receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

a transmitter integral with said transducer assembly for selectively providing a low voltage electrical signal to said transmit transducer elements to generate an ultrasonic pulse;

processing means integral with said transducer assembly and operably associated with said transmitter for controlling said ultrasonic pulses;

receive switching means integral with said transducer assembly and operably associated with said receive set of transducer elements for selecting an electrical signal corresponding to an ultrasonic signal from a target received by a selected one of said receive set of transducer elements; and receive amplifier means integral with said transducer assembly and operably associated with said receive switching means for applying said selected electrical signal, wherein said transducer assembly is a 2D array transducer assembly and a plurality of said multi-layer transmit elements have an electrical impedance of about 200 Ohms or less at operating frequency.

11. An ultrasonic scanner comprising:

an ultrasonic transducer assembly comprising:

(a) a connector having an upper surface, a lower surface and an array of connector pads formed in said connector for electrically connecting said upper surface to said lower surface;

(b) an ultrasonic transducer chip mounted on said upper surface of said connector, said ultrasonic transducer chip being divided into a plurality of transducer elements, said plurality of transducer elements being comprised of a set of multi-layer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

(c) a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element, wherein said low voltage transmitter transmits transducer acoustic energizing voltages of about 15 V or less to said transmit elements; and (d) receive circuitry means integral with said transducer assembly and operably associated with said receive set of transducer elements for selecting an electrical signal corresponding to an ultrasonic signal from a target received by a selected one of said receive set of transducer elements;

transmit processing means operably associated with said ultrasonic transducer assembly for controlling said ultrasonic pulses;

receive processing means operably associated with said ultrasonic transducer assembly for processing said electrical signals corresponding to said ultrasonic pulse received from said target to produce a display output signal; and display means operably associated with said receive processing means for displaying said display output signal.

12. An ultrasonic scanner comprising:

an ultrasonic transducer assembly comprising:

(a) a connector having an upper surface, a lower surface and an array of connector pads formed in said connector for electrically connecting said upper surface to said lower surface;

(b) an ultrasonic transducer chip mounted on said upper surface of said connector, said ultrasonic transducer chip being divided into a plurality of transducer elements, said plurality of transducer elements being comprised of a set of multi-layer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

(c) a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element; and (d) receive circuitry means integral with said transducer assembly and operably associated with said receive set of transducer elements for selecting an electrical signal corresponding to an ultrasonic signal from a target received by a selected one of said receive set of transducer elements;

transmit processing means operably associated with said ultrasonic transducer assembly for controlling said ultrasonic pulses;

receive processing means operably associated with said ultrasonic transducer assembly for processing said electrical signals corresponding to said ultrasonic pulse received from said target to produce a display output signal; and display means operably associated with said receive processing means for displaying said display output signal, wherein said transducer assembly is a linear array transducer assembly and a plurality of said multi-layer transmit elements have an electrical impedance of about 12 Ohms or less at operating frequency.

13. An ultrasonic scanner comprising:

an ultrasonic transducer assembly comprising:

(a) a connector having an upper surface, a lower surface and an array of connector pads formed in said connector for electrically connecting said upper surface to said lower surface;

(b) an ultrasonic transducer chip mounted on said upper surface of said connector, said ultrasonic transducer chip being divided into a plurality of transducer elements, said plurality of transducer elements being comprised of a set of multi-layer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

(c) a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element; and (d) receive circuitry means integral with said transducer assembly and operably associated with said receive set of transducer elements for selecting an electrical signal corresponding to an ultrasonic signal from a target received by a selected one of said receive set of transducer elements;

transmit processing means operably associated with said ultrasonic transducer assembly for controlling said ultrasonic pulses;

receive processing means operably associated with said ultrasonic transducer assembly for processing said electrical signals corresponding to said ultrasonic pulse received from said target to produce a display output signal; and display means operably associated with said receive processing means for displaying said display output signal, wherein said transducer assembly is a 1.5D array transducer assembly and a plurality of said multi-layer transmit elements have an electrical impedance of about 40 Ohms or less at operating frequency.

14. An ultrasonic scanner comprising:

an ultrasonic transducer assembly comprising:

(a) a connector having an upper surface, a lower surface and an array of connector pads formed in said connector for electrically connecting said upper surface to said lower surface;

(b) an ultrasonic transducer chip mounted on said upper surface of said connector, said ultrasonic transducer chip being divided into a plurality of transducer elements, said plurality of transducer elements being comprised of a set of multi-layer transmit transducer elements and a set of receive transducer elements and wherein said ultrasonic transducer chip is mounted on said connector such that a plurality of transducer elements from said transmit set of transducer elements are electrically connected to said lower surface of said connector and a plurality of said receive set of transducer elements are electrically connected to said lower surface of said connector;

(c) a low voltage transmitter integral with said transducer assembly and operably associated with said transmit set of transducer elements for selectively providing an electrical signal to at least a preselected one of said transmit set of transducer elements to thereby generate an ultrasonic pulse from said preselected transducer element; and (d) receive circuitry means integral with said transducer assembly and operably associated with said receive set of transducer elements for selecting an electrical signal corresponding to an ultrasonic signal from a target received by a selected one of said receive set of transducer elements;

transmit processing means operably associated with said ultrasonic transducer assembly for controlling said ultrasonic pulses;

receive processing means operably associated with said ultrasonic transducer assembly for processing said electrical signals corresponding to said ultrasonic pulse received from said target to produce a display output signal; and display means operably associated with said receive processing means for displaying said display output signal, wherein said transducer assembly is a 2D array transducer assembly and a plurality of said multi-layer transmit elements have an electrical impedance of about 200 Ohms or less at operating frequency.

15. The ultrasonic transducer assembly of claim 1 wherein said transmitter further comprises:

transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and transmit amplifier means integral with said transducer assembly and responsive to a trigger signal for providing a high voltage electrical signal to said transmit switching means to generate said ultrasonic pulse.

16. The ultrasonic transducer assembly of claim 1 wherein said transmitter and said receive circuitry means are mounted in said transducer handle.

17. The ultrasonic transducer assembly of claim 2 wherein said transmitter further comprises:

transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and transmit amplifier means integral with said transducer assembly and responsive to a trigger signal for providing a high voltage electrical signal to said transmit switching means to generate said ultrasonic pulse.

18. The ultrasonic transducer assembly of claim 2 wherein said transmitter and said receive circuitry means are mounted in said transducer handle.

19. The ultrasonic transducer assembly of claim 6 wherein said transmitter, said receive switching means and said receive amplifier means are mounted in said transducer handle.

20. The ultrasonic transducer assembly of claim 6 wherein said transmitter, said receive switching means and said receive amplifier means are mounted on said connector.

21. The ultrasonic transducer assembly of claim 7 wherein said transmitter, said receive switching means and said receive amplifier means are mounted in said transducer handle.

22. The ultrasonic transducer assembly of claim 7 wherein said transmitter, said receive switching means and said receive amplifier means are mounted on said connector.

23. The ultrasonic transducer assembly of claim 8 wherein said transmitter, said receive switching means and said receive amplifier means are mounted in said transducer handle.

24. The ultrasonic transducer assembly of claim 8 wherein said transmitter, said receive switching means and said receive amplifier means are mounted on said connector.

25. The ultrasonic transducer assembly of claim 9 wherein said transmitter, said receive switching means and said receive amplifier means are mounted in said transducer handle.

26. The ultrasonic transducer assembly of claim 9 wherein said transmitter, said receive switching means and said receive amplifier means are mounted on said connector.

27. The ultrasonic transducer assembly of claim 10 wherein said transmitter, said receive switching means and said receive amplifier means are mounted in said transducer handle.

28. The ultrasonic transducer assembly of claim 10 wherein said transmitter, said receive switching means and said receive amplifier means are mounted on said connector.

29. The ultrasonic scanner of claim 11 wherein said transmit circuitry means further comprises:

transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and transmit amplifier means integral with said transducer assembly and responsive to a trigger signal for providing a high voltage electrical signal to said transmit switching means to generate said ultrasonic pulse.

30. The ultrasonic scanner claim 29 wherein said receive circuitry means comprises:
- receive switching means integral with said transducer assembly and operably associated with said receive set of transducer elements for selecting an electrical signal corresponding to an ultrasonic signal from a target received by a selected one of said receive set of transducer elements; and
- receive amplifier means integral with said transducer assembly and operably associated with said receive switching means for amplifying said selected electrical signal.

31. The ultrasonic transducer assembly of claim 30 wherein said transmit switching means, said transmit amplifier means, said receive switching means and said receive amplifier means are mounted in said transducer handle.

32. The ultrasonic transducer assembly of claim 30 wherein said transmit switching means, said transmit amplifier means, said receive switching means and said receive amplifier means are mounted on said connector.

33. The ultrasonic scanner of claim 12 wherein said transmit circuitry means further comprises:
- transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and
- transmit amplifier means integral with said transducer assembly and responsive to a trigger signal for providing a high voltage electrical signal to said transmit switching means to generate said ultrasonic pulse.

34. The ultrasonic scanner claim 33 wherein said receive circuitry means comprises:
- receive switching means integral with said transducer assembly and operably associated with said receive set of transducer elements for selecting an electrical signal corresponding to an ultrasonic signal from a target received by a selected one of said receive set of transducer elements; and
- receive amplifier means integral with said transducer assembly and operably associated with said receive switching means for amplifying said selected electrical signal.

35. The ultrasonic transducer assembly of claim 34 wherein said transmit switching means, said transmit amplifier means, said receive switching means and said receive amplifier means are mounted in said transducer handle.

36. The ultrasonic transducer assembly of claim 34 wherein said transmit switching means, said transmit amplifier means, said receive switching means and said receive amplifier means are mounted on said connector.

37. The ultrasonic scanner of claim 13 wherein said transmit circuitry means further comprises:
- transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and
- transmit amplifier means integral with said transducer assembly and responsive to a trigger signal for providing a high voltage electrical signal to said transmit switching means to generate said ultrasonic pulse.

38. The ultrasonic scanner claim 37 wherein said receive circuitry means comprises:
- receive switching means integral with said transducer assembly and operably associated with said receive set of transducer elements for selecting an electrical signal corresponding to an ultrasonic signal from a target received by a selected one of said receive set of transducer elements; and
- receive amplifier means integral with said transducer assembly and operably associated with said receive switching means for amplifying said selected electrical signal.

39. The ultrasonic transducer assembly of claim 38 wherein said transmit switching means, said transmit amplifier means, said receive switching means and said receive amplifier means are mounted in said transducer handle.

40. The ultrasonic transducer assembly of claim 38 wherein said transmit switching means, said transmit amplifier means, said receive switching means and said receive amplifier means are mounted on said connector.

41. The ultrasonic scanner of claim 14 wherein said transmit circuitry means further comprises:
- transmit switching means integral with said transducer assembly and operably associated with said transmit set of transducer elements for selectively providing an electrical signal to at least a preselected one of said transmit set of transducer elements to thereby generate an ultrasonic pulse from said preselected transducer element; and
- transmit amplifier means integral with said transducer assembly and responsive to a trigger signal for providing a high voltage electrical signal to said transmit switching means to generate said ultrasonic pulse.

42. The ultrasonic scanner claim 41 wherein said receive circuitry means comprises:
- receive switching means integral with said transducer assembly and operably associated with said receive set of transducer elements for selecting an electrical signal corresponding to an ultrasonic signal from a target received by a selected one of said receive set of transducer elements; and
- receive amplifier means integral with said transducer assembly and operably associated with said receive switching means for amplifying said selected electrical signal.

43. The ultrasonic transducer assembly of claim 42 wherein said transmit switching means, said transmit amplifier means, said receive switching means and said receive amplifier means are mounted in said transducer handle.

44. The ultrasonic transducer assembly of claim 42 wherein said transmit switching means, said transmit amplifier means, said receive switching means and said receive amplifier means are mounted on said connector.

* * * * *